(12) United States Patent
Stroier et al.

(10) Patent No.: US 12,189,703 B2
(45) Date of Patent: Jan. 7, 2025

(54) WEBSITE QUALITY ASSESSMENT SYSTEM PROVIDING SEARCH ENGINE RANKING NOTIFICATIONS

(71) Applicant: Siteimprove A/S, Copenhagen (DK)

(72) Inventors: Christoffer Lund Stroier, Copenhagen (DK); Andrei Popa, Copenhagen (DK); Andreas Kjeldsen, Copenhagen (DK)

(73) Assignee: Siteimprove A/S, Copenhagen (DK)

( * ) Notice: Subject to any disclaimer, the term of this patent is extended or adjusted under 35 U.S.C. 154(b) by 261 days.

(21) Appl. No.: 17/677,658

(22) Filed: Feb. 22, 2022

(65) Prior Publication Data
US 2023/0153367 A1    May 18, 2023

Related U.S. Application Data

(60) Provisional application No. 63/278,612, filed on Nov. 12, 2021.

(51) Int. Cl.
G06F 16/9538   (2019.01)
G06F 16/951    (2019.01)
(Continued)

(52) U.S. Cl.
CPC ........ *G06F 16/9538* (2019.01); *G06F 16/951* (2019.01); *G06F 16/9535* (2019.01); *G06F 16/9537* (2019.01); *G06F 16/955* (2019.01)

(58) Field of Classification Search
CPC .............. G06F 16/9538; G06F 16/951; G06F 16/9535; G06F 16/9537; G06F 16/955
See application file for complete search history.

(56) References Cited

U.S. PATENT DOCUMENTS

| 836,414 A | 11/1906 | Toles |
| 6,360,235 B1 | 3/2002 | Tilt |

(Continued)

FOREIGN PATENT DOCUMENTS

| WO | WO 2012/027022 | 3/2012 |
| WO | WO 2016/015031 A1 | 1/2016 |

OTHER PUBLICATIONS

Simo Ahava: "Track Interactions In The Shadow DOM Using Google Tag Manager I Simo Ahava's blog", EPO Form 1703 01 .91 TRI, May 11, 2020 (May 11, 2020), XP093030963, accessed at URL:https://www.simoahava.com/analytics/track-interactions-inshadow-dom-google-tag-manager/ on Mar. 13, 2023.

(Continued)

*Primary Examiner* — Mariela Reyes
*Assistant Examiner* — Fatima P Mina
(74) *Attorney, Agent, or Firm* — Barnes & Thornburg LLP

(57) ABSTRACT

Described are systems and methods for providing webpage insights to a user. The method can include receiving, by a computing system, an indication that a user of a user account with the computing system specified a type of query indicating a geographic location of computing devices from which queries of the type of query originate, identifying a webpage to identify from search results of queries of the type, including those requested from the geographic location, receiving search ranking of the webpage from a querying computing system, comparing the search ranking to a historic search ranking to determine a change in search ranking, determining whether the change satisfies criteria for a threshold level of search ranking movement, and providing information for presentation in a GUI that includes, in a list of ranked notifications, an indication that the search ranking of the webpage for the type of query changed.

20 Claims, 13 Drawing Sheets

(51) Int. Cl.
*G06F 16/9535* (2019.01)
*G06F 16/9537* (2019.01)
*G06F 16/955* (2019.01)

(56) References Cited

U.S. PATENT DOCUMENTS

| | | | |
|---|---|---|---|
| 7,231,606 | B2 | 6/2007 | Miller et al. |
| 7,475,067 | B2 | 1/2009 | Clary et al. |
| 7,558,795 | B2 | 7/2009 | Malik et al. |
| 7,584,435 | B2 | 9/2009 | Bailey et al. |
| 7,797,200 | B2 | 9/2010 | Patrawala |
| 7,805,428 | B2 | 9/2010 | Batista Reyes et al. |
| 8,065,410 | B1 | 11/2011 | Breen et al. |
| 8,196,104 | B2 | 6/2012 | Cohrs et al. |
| 8,447,751 | B2 | 5/2013 | Stouffer et al. |
| 8,533,684 | B2 | 9/2013 | Brunet et al. |
| 8,554,698 | B2 | 10/2013 | Bando et al. |
| 8,613,039 | B2 | 12/2013 | Chen et al. |
| 8,972,379 | B1* | 3/2015 | Grieselhuber ........ G06F 16/951 707/795 |
| 9,009,784 | B2 | 4/2015 | Chen et al. |
| 9,087,035 | B1 | 7/2015 | Bandaru et al. |
| 9,152,729 | B2 | 10/2015 | Ajoku et al. |
| 9,405,186 | B1* | 8/2016 | Abdo .................... G06F 30/398 |
| 9,537,732 | B2 | 1/2017 | Mukherjee et al. |
| 9,563,422 | B2 | 2/2017 | Cragun et al. |
| 10,114,902 | B2 | 10/2018 | Byakod et al. |
| 10,169,188 | B2 | 1/2019 | Belekar et al. |
| 10,229,205 | B1* | 3/2019 | Grant .................... G06F 16/951 |
| 10,534,512 | B2 | 1/2020 | Jadhav et al. |
| 10,706,122 | B2 | 7/2020 | Sabbavarpu |
| 10,831,831 | B2 | 11/2020 | Greene |
| 10,860,594 | B2 | 12/2020 | Jamshidi |
| 10,963,470 | B2 | 3/2021 | Jamshidi |
| 10,970,294 | B2 | 4/2021 | Jamshidi |
| 11,113,276 | B2 | 9/2021 | Zhao |
| 11,262,979 | B2 | 3/2022 | Deshmukh et al. |
| 11,860,959 | B1* | 1/2024 | Chang ................ G06F 16/9535 |
| 2004/0039734 | A1 | 2/2004 | Judd et al. |
| 2006/0253345 | A1 | 11/2006 | Herber |
| 2008/0133500 | A1 | 6/2008 | Edwards |
| 2009/0113287 | A1 | 4/2009 | Yee |
| 2010/0042608 | A1 | 2/2010 | Kane |
| 2011/0016108 | A1* | 1/2011 | Pelenur ................. G06F 16/951 707/E17.014 |
| 2012/0010927 | A1 | 1/2012 | Attenberg et al. |
| 2012/0016897 | A1* | 1/2012 | Tulumbas ........... G06F 16/9566 707/E17.069 |
| 2012/0017281 | A1 | 1/2012 | Bannerjee et al. |
| 2012/0047120 | A1 | 2/2012 | Connolly |
| 2012/0254405 | A1 | 10/2012 | Ganesh et al. |
| 2012/0254723 | A1 | 10/2012 | Kasa et al. |
| 2013/0046747 | A1* | 2/2013 | Gouyet ............. G06F 16/24578 707/706 |
| 2013/0282691 | A1 | 10/2013 | Stouffer et al. |
| 2014/0047318 | A1 | 2/2014 | Glazkov |
| 2014/0164345 | A1 | 6/2014 | Connolly et al. |
| 2014/0304578 | A1 | 10/2014 | Parkinson et al. |
| 2015/0039746 | A1 | 2/2015 | Mukherjee et al. |
| 2015/0317132 | A1 | 11/2015 | Rempell et al. |
| 2015/0348071 | A1 | 12/2015 | Cochrane et al. |
| 2016/0055490 | A1* | 2/2016 | Keren ................... G06Q 30/00 705/14.47 |
| 2016/0210360 | A9 | 7/2016 | Stouffer et al. |
| 2016/0335353 | A1 | 11/2016 | Gianos et al. |
| 2016/0353148 | A1 | 12/2016 | Prins et al. |
| 2017/0249312 | A1* | 8/2017 | Wang .................... G06F 16/951 |
| 2017/0337168 | A1 | 11/2017 | Kunze |
| 2018/0046929 | A1* | 2/2018 | Xuan ................... G06Q 10/00 |
| 2018/0210965 | A1 | 7/2018 | Grigoryan et al. |
| 2019/0073365 | A1 | 3/2019 | Jamshidi |
| 2020/0151187 | A1 | 5/2020 | Jamshidi |
| 2020/0293606 | A1* | 9/2020 | Nelson ................. G06F 40/117 |
| 2020/0394200 | A1 | 12/2020 | Jamshidi |
| 2021/0120014 | A1* | 4/2021 | Argoety ................ G06F 21/552 |
| 2021/0326348 | A1 | 10/2021 | Jamshidi |

OTHER PUBLICATIONS

EP Supplementary Search Report in European Application No. EP18853482, dated Mar. 29, 2020, 9 pages.
Gustafsdottir [online], "CMS Plugin: Frequently Asked Questions," Siteimprove.com, Jul. 9, 2020, 3 pages.
Gustafsdottir [online], "How to navigate the Siteimprove CMS Plugin," Siteimprove.com, Sep. 10, 2020, 7 pages.
International Preliminary Report on Patentability in PCT Appln. No. PCT/US2018/049809, dated Mar. 10, 2020, 13 pages.
International Search Report and Written Opinion in Application No. PCT/US2018/049809, mailed on Nov. 19, 2018, 13 pages.
Kamal, "Evaluating web accessibility metrics for Jordanian Universities," International Journal of Advanced Computer Science and Applications, 2016, 7(7):113-122.
Needham [online], "CMS Plugin: Security FAQ," Siteimprove.com, Aug. 9, 2020, 2 pages.
Needham [online], "On which CMS is the Siteimprove plugin available?," Siteimprove.com, May 7, 2020, 11 pages.
Sergio Pedercini [online], "How to code a responsive circular percentage chart with SVG and CSS", retrieved from URL: https://nnediunn.conn/@pppped/how-to-code-a-responsive-circular-percentage-chart-with-svg-and-css-3632f8cd7705, May 17, 2017, 5 pages.
Silktide.com [online], "Silktide," available on or before Feb. 8, 2017, via Internet Archive: Wayback Machine URL <https://web.archive.org/web/20170208112649/https://silktide.com/>, retrieved on May 7, 2020, URL<http://www.silktide.comt>, 2 pages.
Sitebeam.net [online], "Sitebeam," available on or before Feb. 4, 2017, via Internet Archive: Wayback Machine URL <https://web.archive.org/web/20170204162753/http://sitebeam.net/>, retrieved on May 7, 2020, URL<http://www.sitebeam.net>, 4 pages.
Siteimprove.com [online], "Adobe Experience Manager: Siteimprove provided plugin," available on or before Aug. 12, 2020, via Internet Archive: Wayback Machine URL <https://web.archive.org/web/20200812065134/https:/siteimprove.com/en/core-platform/integrations/cms-plugin/adobe-experience-manager/>, retrieved on Mar. 21, 2022, URL<https://siteimprove.com/en/core-platform/integrations/cms-plugin/adobe-experience-manager/>, 18 pages.
Siteimprove.com [online], "Adobe Experience Manager: Siteimprove provided plugin," available on or before Sep. 20, 2020, via Internet Archive: Wayback Machine URL <https://web.archive.org/web/20200920011517/https:/siteimprove.com/en/core-platform/integrations/cms-plugin/adobe-experience-manager//>, retrieved on Mar. 21, 2022, URL<https://siteimprove.com/en/core-platform/integrations/cms-plugin/adobe-experience-manager/>, 18 pages.
Siteimprove.com [online], "Aug. & Sep. 2021 Release Highlights," Oct. 8, 2021, retrieved on Mar. 21, 2022, retrieved from URL<https://help.siteimprove.com/support/solutions/articles/80000946947-august-september-2021- release-highlights>, 2 pages.
Siteimprove.com [online], "Drupal," available on or before Aug. 12, 2020, via Internet Archive: Wayback Machine URL <https://web.archive.org/web/20200812071254/https:/siteimprove.com/en/core-platform/integrations/cms-plugin/drupal/>, retrieved on Mar. 21, 2022, URL<https://siteimprove.com/en/core-platform/integrations/cms-plugin/drupal/>, 12 pages.
Siteimprove.com [online], "Feb. 2021 Release Highlights," Sep. 23, 2021, retrieved on Mar. 21, 2022, retrieved from URL<https://help.siteimprove.com/support/solutions/articles/80000863866#h_01F0GCPTWX5H3ZS558VIGVEQQN>, 3 pages.
Siteimprove.com [online], "Feb. 2021 Release Highlights," Sep. 23, 2021, retrieved on Mar. 21, 2022, retrieved from URL<https://help.siteimprove.com/support/solutions/articles/80000863866-february-2021-release-highlights>, 3 pages.
Siteimprove.com [online], "Jan. 2021 Release Highlights," Oct. 1, 2021, retrieved on Mar. 21, 2022, retrieved from URL<https://help.siteimprove.com/support/solutions/articles/80000863867-january-2021-release-highlights>, 3 pages.

(56) References Cited

OTHER PUBLICATIONS

Siteimprove.com [online], "Jul. 2021 Release Highlights," Sep. 23, 2021, retrieved on Mar. 21, 2022, retrieved from URL<https://help.siteimprove.com/support/solutions/articles/80000863850-july-2021-release-highlights>, 4 pages.

Siteimprove.com [online], "Oct. & Nov. 2021 Release Highlights," Dec. 7, 2021, retrieved on Mar. 21, 2022, retrieved from URL<https://help.siteimprove.com/support/solutions/articles/80000958280-october-november-2021-release-highlights>, 3 pages.

Siteimprove.com [online], "Oct. 2020 Release Highlights," Nov. 16, 2021, retrieved on Mar. 21, 2022, retrieved from URL<https://help.siteimprove.com/support/solutions/articles/80000448376-october-2020-release-highlights>, 2 pages.

Siteimprove.com [online], "Optimizely + Siteimprove," available on or before Jun. 16, 2021, via Internet Archive: Wayback Machine URL<https://web.archive.org/web/20210616140532/https:/siteimprove.com/en/core-platform/integrations/cms-plugin/optimizely/>, retrieved on Mar. 21, 2022, URL<https://siteimprove.com/en/core-platform/integrations/cms-plugin/optimizely//>, 12 pages.

Siteimprove.com [online], "Siteimprove CMS Plugin Integration Cookbook," available on or before Aug. 5, 2020, via Internet Archive: Wayback Machine URL<https://web.archive.org/web/20200805195514/https:/developer.siteimprove.com/cms-plugin-integration-cookbook/>, retrieved on Mar. 21, 2022, URL<https://developer.siteimprove.com/cms-plugin-integration-cookbook/>, 13 pages.

Siteimprove.com [online], "Web accessibility for all with the next generation of Siteimprove Accessibility," Mar. 20, 2020, retrieved on Mar. 21, 2022, retrieved from URL<https://siteimprove.com/en-us/blog/web-accessibility-for-all-with-next-generation-siteimprove-accessibility/>, 36 pages.

Wikipedia.com [online], "URI normalization," Oct. 20, 2020, retrieved on Mar. 21, 2022, retrieved from URL<https://en.wikipedia.org/w/index.php?title=URI_normalization&oldid=984473278>, 2 pages.

Zhou, "Evaluating Websites Using a Practical Quality Model", Software Technology Research Laboratory, De Montfort University, 2009, 113 pages.

* cited by examiner

FIG. 1

WEBSITE QUALITY ASSESSMENT SYSTEM PROVIDING SEARCH ENGINE RANKING NOTIFICATIONS

CROSS-REFERENCE TO RELATED APPLICATIONS

This application is a utility from provisional application of and claims the benefit of priority to U.S. Provisional Application No. 63/278,612, filed on Nov. 12, 2021, the contents of which are hereby incorporated by reference.

TECHNICAL FIELD

This document describes devices, systems, and methods related to optimizing website performance and monitoring search engine ranking.

BACKGROUND

Websites can vary in their quality. The quality of a website can affect user experience of users who visit the website. For example, websites with broken links, misspellings, and other features that do not function as intended can be frustrating for users visiting a site. Additionally, websites that are not optimized for search engines (also referred to as SEO) may have a low level of quality because users may not be able to locate relevant pages on the website (or locate the website more generally) using a search engine. For example, websites that do not have information formatted properly for search engines to retrieve and associate with other information on the page may have low levels of SEO, which may result in those websites not appearing as prominently in search results as they otherwise could for relevant search strings. Websites can also have a low level of quality if they are not readily accessible to all users regardless of impairment (also referred to as "website accessibility"). For example, if a website is not formatted properly, users who are seeing or hearing impaired may not be able to use website reader applications to review and navigate through the content.

SUMMARY

The document generally relates to assessing and improving website quality based on SEO analysis. The disclosed techniques can be used to generate website SEO insights and suggestions, by a web analysis server system, to optimize the website's performance, thereby improving its overall quality and user experiences with the website. Customers of the web analysis server system can create different types of queries that the web analysis server system may use to monitor search engine visibility and activity for the customers' websites. A customer can specify types of queries for web traffic in specific geographic regions, different types of users or groups of users, specific products that are available on the customer's website, and technical aspects of SEO, such as sitemaps and structured markup. The web analysis server system can use the customer-specified types of queries to retrieve information about the customer's website that can be used to generate SEO insights and suggestions for optimizing the website's performance.

Different types of SEO insights can be generated by the web analysis server system and presented to the customer in a ranked list of notifications. Example SEO insights can include, but is not limited to, visibility in search engine results, keyword monitoring, search engine analytics, content optimization, target page optimization, competitor analysis, target page metrics, particular SEO-related issues (e.g., focus issues), low-value backlinks, duplicative content, and misspellings. SEO insights can be ranked based on impact on website performance in search engine ranking. Therefore, SEO insights having a greatest impact on the website performance can be ranked higher in the list of notifications than SEO insights having a smallest impact. This ranking can be beneficial to help the customer prioritize their review of the insights.

Although the disclosed inventive concepts include those defined in the attached claims, it should be understood that the inventive concepts can also be defined in accordance with the following embodiments.

Embodiment A1 is a computer-implemented method for providing insights to a user about at least one webpage, the computer-implemented method comprising: receiving, by a computing system, an indication that user input at a client computing device that is logged into a user account with the computing system specified a type of query, wherein the type of query indicates a geographic location of computing devices from which queries of the type of query originate; identifying, by the computing system, a webpage to identify from within search results of queries that are of the type of query, including that are indicated as being requested from computing devices at the geographic location; receiving, by the computing system, information from a querying computing system indicating a search ranking of the webpage from within search results received responsive to submission of one or more queries of the type of query; comparing, by the computing system, the search ranking to a historic search ranking of the webpage to determine a change in search ranking of the webpage; determining, by the computing system, whether the change in search ranking of the webpage satisfies criteria that corresponds to a threshold level of search ranking movement; and providing, by the computing system and based on the type of query having achieved the threshold level of search ranking movement, information to cause a user computing device logged into the user account to present a graphical user interface (GUI) that includes, as part of a list of ranked notifications, an indication that the search ranking of the webpage for the type of query has changed.

Embodiment A2 is the computer-implemented method of embodiment A1, further comprising: receiving, by the computing system, an indication that user input at a client computing device that is logged into the user account specified a second type of query, wherein the second type of query indicates a second geographic location of computing devices from which queries of the second type of query originate, the second geographic location being different from the first geographic location; identifying, by the computing system, the webpage to identify from within search results of queries that are of the second type of query, including that are indicated as being requested from computing devices at the second geographic location; receiving, by the computing system, information from the querying computing system indicating a second search ranking of the webpage from within search results received responsive to submission of one or more queries of the second type of query; comparing, by the computing system, the second search ranking to a second historic search ranking of the webpage to determine a second change in search ranking of the webpage; and determining, by the computing system, whether the second change in search ranking of the webpage satisfies second criteria that corresponds to a second threshold level of search ranking movement, wherein the GUI includes, as part of the ranked list of notifications, an indication that the second search ranking of the webpage for the second type of query has changed, based on the second type of query having achieved the second threshold level of search ranking movement.

Embodiment A3 is the computer-implemented method of any one of embodiments A1 through A2, wherein the user input that specified the type of query specified, in addition to the geographic location, a first keyword to submit within queries of the type of query; and the user input that specified the second type of query specified, in addition to the second geographic location, a second keyword to submit within queries of the second type of query, the second keyword being different from the first keyword.

Embodiment A4 is the computer-implemented method of any one of embodiments A1 through A3, further comprising: determining, by the computing system, a first ranking for the indication that the search ranking of the webpage for the type of query has changed, within the list of ranked notifications, based on total estimated traffic to the webpage from queries of the type of query; and determining, by the computing system, a second ranking for the indication that the second search ranking of the webpage for the second type of query has changed, within the list of ranked notifications, based on total estimated traffic to the webpage from queries of the second type of query.

Embodiment A5 is the computer-implemented method of any one of embodiments A1 through A4, wherein each notification in the ranked list of notifications comprises an indication that a search ranking of the webpage for a corresponding type of has changed.

Embodiment A6 is the computer-implemented method of any one of embodiments A1 through A5, wherein at least a portion of indications in the list of notifications corresponds to a same type of query.

Embodiment A7 is the computer-implemented method of any one of embodiments A1 through A6, wherein at least a portion of indications in the list of notifications corresponds to different types of queries.

Embodiment A8 is the computer-implemented method of any one of embodiments A1 through A7, further comprising receiving, by the computing system, an indication that user input at the client computing device that is logged into the user account specified the webpage, to cause the querying computing system to identify the webpage from within search results of queries that are of the type of query.

Embodiment A9 is the computer-implemented method of any one of embodiments A1 through A8, wherein: the user input that specified the type of query specified, in addition to the geographic location, a first keyword to submit within queries of the type of query; and the computer-implemented method further comprises: receiving, by the computing system and from the querying computing system, information identifying a suggested keyword that user input had not specified for the type of query; designating, by the computing system, the suggested keyword as a keyword for the type of query; and generating, by the computing system, an indication as part of the list of ranked notifications that the suggested keyword has been designated for the type of query.

Embodiment A10 is the computer-implemented method of any one of embodiments A1 through A9, further comprising: receiving, by the computing system, information that identifies multiple webpages that link to the webpage and that are identified as being below a threshold level of website quality, wherein the information provided to the user computing device logged into the user account causes the user computing device to present, as part of the list of ranked notifications, an indication that the multiple webpages that are below the threshold level of quality have been identified as linking to the webpage.

Embodiment A11 is the computer-implemented method of any one of embodiments A1 through A10, further comprising determining, by the computing system, a suggestion to remove at least one link between at least one of the multiple webpages and the webpage.

Embodiment A12 is the computer-implemented method of any one of embodiments A1 through A11, further comprising: determining, by the computing system, a similarity level between a first webpage and a second webpage, the first webpage and the second webpage being webpages of a website that includes the webpage, wherein the information provided to the user computing device logged into the user account causes the user computing device to present, as part of the list of ranked notifications, an indication that the first webpage and the second webpage have duplicative content.

Embodiment A13 is the computer-implemented method of any one of embodiments A1 through A12, further comprising determining, by the computing system, a suggestion to remove the duplicative content.

Embodiment A14 is the computer-implemented method of any one of embodiments A1 through A13, further comprising determining, by the computing system, a suggestion to apply at least one of a no-index tag, a no-follow tag, an hreflang tag, and a canonical tag to one of the first webpage and the second webpage.

Embodiment B1 is a computer-implemented method for providing insights to a user about at least one webpage, the computer-implemented method comprising: receiving, by a computing system, an indication that user input at a client computing device that is logged into a user account with the computing system specified a type of query, including by specifying that the type of query indicates (i) a first keyword to submit within queries of the type of query, and (ii) a first geographic location of computing devices from which queries of the type of query originate; identifying, by the computing system, a webpage to locate within search results of queries that are of the type of query due to the queries of the type of query including the first keyword and indicating that the queries of the type of query were requested from computing devices at the first geographic location; receiving, by the computing system, information from a querying computing system indicating a search ranking of the webpage for the type of query from within search results received responsive to submission of one or more queries of the type of query, due to the one or more queries of the first type of query including the first keyword and indicating that the one or more queries of the first type of query were requested from computing devices at the first geographic location; comparing, by the computing system, the search ranking of the webpage for the type of query to a historic search ranking of the webpage for the type of query to determine a change in search ranking of the webpage for the type of query; determining, by the computing system, whether the change in search ranking of the webpage for the type of query satisfies criteria that corresponds to a threshold level of search ranking movement; and providing, by the computing system and based on the type of query having achieved the threshold level of search ranking movement, information to cause a user computing device logged into the user account to present a graphical user interface (GUI) that includes, as part of a list of ranked notifications, an indication that the search ranking of the webpage for the type of query has changed.

Embodiment B2 is the computer-implemented method of embodiment B1, further comprising: receiving, by the computing system, an indication that user input at a client computing device that is logged into the user account specified a second type of query, including by specifying that the second type of query indicates (i) a second keyword to submit within queries of the second type of query, and (ii) a second geographic location of computing devices from which queries of the second type of query originate, the second keyword being different from the first keyword and the second geographic location being different from the first geographic location; identifying, by the computing system, the webpage to identify from within search results of queries that are of the second type of query due to the queries of the second type of query including the second keyword and indicating that the queries of the second type of query were requested from computing devices at the second geographic location; receiving, by the computing system, information from the querying computing system indicating a second search ranking of the webpage for the second type of query from within search results received responsive to submission of one or more queries of the second type of query, due to the one or more queries of the second type of query including the second keyword and indicating that the one or more queries of the second type of query were requested from computing devices at the second geographic location; comparing, by the computing system, the second search ranking of the webpage for the second type of query to a second historic search ranking of the webpage for the second type of query to determine a second change in search ranking of the webpage for the second type of query; and determining, by the computing system, whether the second change in search ranking of the webpage for the second type of query satisfies second criteria that corresponds to a second threshold level of search ranking movement, wherein the GUI includes, as part of the ranked list of notifications based on the second type of query having achieved the second threshold level of search ranking movement, an indication that the second search ranking of the webpage for the second type of query has changed.

Embodiment B3 is the computer-implemented method of any one of embodiments B1 through B2, further comprising: determining, by the computing system, a first ranking for the indication that the search ranking of the webpage for the type of query has changed, within the list of ranked notifications presented by the GUI, based on total estimated traffic to the webpage from queries of the type of query, wherein the GUI presents the indication that the search ranking of the webpage for the type of query has changed at a first position within the list of ranked notifications that is based on the first ranking; and determining, by the computing system, a second ranking for the indication that the second search ranking of the webpage for the second type of query has changed, within the list of ranked notifications presented by the GUI, based on total estimated traffic to the webpage from queries of the second type of query, wherein the GUI presents the indication that the second search ranking of the webpage for the second type of query has changed at a second position within the list of ranked notifications based on the second ranking.

Embodiment B4 is the computer-implemented method of any one of embodiments B1 through B3, wherein each notification that is presented by the GUI in the ranked list of notifications comprises an indication that a search ranking of the webpage for a corresponding type of query has changed.

Embodiment B5 is the computer-implemented method of any one of embodiments B1 through B4, wherein multiple notifications that are presented by the GUI in the ranked list of notifications correspond to indications that a search ranking for a same type of query has changed.

Embodiment B6 is the computer-implemented method of any one of embodiments B1 through B5, wherein at least a portion of indications in the list of notifications corresponds to different types of queries.

Embodiment B7 is the computer-implemented method of any one of embodiments B1 through B6, further comprising receiving, by the computing system, an indication that user input at the client computing device that is logged into the user account specified the webpage, to cause the querying computing system to locate the webpage within search results of queries that are of the type of query.

Embodiment B8 is the computer-implemented method of any one of embodiments B1 through B7, further comprising: receiving, by the computing system and from the querying computing system, information identifying a suggested keyword for which the webpage appears in search results of queries requested from computing devices at the first geographic location, the suggested keyword having not been specified for the type of query by user input in association with the user account; and providing, by the computing system, information to cause the GUI to include, as part of the list of ranked notifications, an indication that the suggested keyword appears in search results for queries requested from computing devices at the first geographic location.

Embodiment B9 is the computer-implemented method of any one of embodiments B1 through B8, further comprising: receiving, by the computing system, information that identifies that multiple webpages link to the webpage and are identified as being below a threshold level of website quality, wherein the information provided to the user computing device logged into the user account causes the user computing device to present, as part of the list of ranked notifications, an indication that the multiple webpages link to the webpage and are below the threshold level of quality.

Embodiment B10 is the computer-implemented method of any one of embodiments B1 through B9, wherein the indication that the multiple webpages link to the webpage and are below the threshold level of quality includes a suggestion to remove at least one link between at least one of the multiple webpages and the webpage.

Embodiment B11 is the computer-implemented method of any one of embodiments B1 through B10, further comprising: determining, by the computing system, that a first webpage and a second webpage include duplicative content presented by each of the first webpage and the second webpage, the first webpage and the second webpage being webpages of a website that includes the webpage, wherein the information provided to the user computing device logged into the user account causes the user computing device to present, as part of the list of ranked notifications, an indication that the first webpage and the second webpage include the duplicative content presented by each of the first webpage and the second webpage.

Embodiment B12 is the computer-implemented method of any one of embodiments B1 through B11, wherein the indication that the first webpage and the second webpage include the duplicative content includes a suggestion to remove the duplicative content from at least one of the first webpage and the second webpage.

Embodiment B13 is the computer-implemented method of any one of embodiments B1 through B12, wherein the indication that the first webpage and the second webpage include the duplicative content includes a suggestion to apply at least one of a no-index tag, a no-follow tag, an hreflang tag, and a canonical tag to at least one of the first webpage and the second webpage.

Embodiment B14 is the computer-implemented method of any one of embodiments B1 through B13, further comprising: determining, by the computing system, a priority score for each indication in the list of ranked notifications, wherein the priority score is based at least in part on an impact level associated with the indication on at least the webpage; and ranking, by the computing system, each indication in the list of ranked notifications based on the respective priority score, from a highest priority score to a lowest priority score.

Embodiment B15 is the computer-implemented method of any one of embodiments B1 through B14, further comprising: normalizing, by the computing system, the priority score for each indication in the list of ranked notifications; and ranking, by the computing system, each indication in the list of ranked notifications based on the respective normalized priority score.

Embodiment B16 is the computer-implemented method of any one of embodiments B1 through B15, further comprising multiplying, by the computing system, the priority score for each indication in the list of ranked notifications by a factor that corresponds to the impact level associated with the respective indication, wherein a higher impact level corresponds to a higher multiplication factor than a lower impact level.

Embodiment B17 is a computing system, comprising: one or more processors; and one or more computer-readable devices including instructions that, when executed by the one or more processors, cause the computing system to perform operations that include: receiving, by the computing system, an indication that user input at a client computing device that is logged into a user account with the computing system specified a type of query, including by specifying that the type of query indicates (i) a first keyword to submit within queries of the type of query, and (ii) a first geographic location of computing devices from which queries of the type of query originate; identifying, by the computing system, a webpage to locate within search results of queries that are of the type of query due to the queries of the type of query including the first keyword and indicating that the queries of the type of query were requested from computing devices at the first geographic location; receiving, by the computing system, information from a querying computing system indicating a search ranking of the webpage for the type of query from within search results received responsive to submission of one or more queries of the type of query, due to the one or more queries of the first type of query including the first keyword and indicating that the one or more queries of the first type of query were requested from computing devices at the first geographic location; comparing, by the computing system, the search ranking of the webpage for the type of query to a historic search ranking of the webpage for the type of query to determine a change in search ranking of the webpage for the type of query; determining, by the computing system, whether the change in search ranking of the webpage for the type of query satisfies criteria that corresponds to a threshold level of search ranking movement; and providing, by the computing system and based on the type of query having achieved the threshold level of search ranking movement, information to cause a user computing device logged into the user account to present a graphical user interface (GUI) that includes, as part of a list of ranked notifications, an indication that the search ranking of the webpage for the type of query has changed.

Embodiment B18 is the computing system of embodiment B17, wherein the operations further include: receiving, by the computing system, an indication that user input at a client computing device that is logged into the user account specified a second type of query, including by specifying that the second type of query indicates (i) a second keyword to submit within queries of the second type of query, and (ii) a second geographic location of computing devices from which queries of the second type of query originate, the second keyword being different from the first keyword and the second geographic location being different from the first geographic location; identifying, by the computing system, the webpage to identify from within search results of queries that are of the second type of query due to the queries of the second type of query including the second keyword and indicating that the queries of the second type of query were requested from computing devices at the second geographic location; receiving, by the computing system, information from the querying computing system indicating a second search ranking of the webpage for the second type of query from within search results received responsive to submission of one or more queries of the second type of query, due to the one or more queries of the second type of query including the second keyword and indicating that the one or more queries of the second type of query were requested from computing devices at the second geographic location; comparing, by the computing system, the second search ranking of the webpage for the second type of query to a second historic search ranking of the webpage for the second type of query to determine a second change in search ranking of the webpage for the second type of query; and determining, by the computing system, whether the second change in search ranking of the webpage for the second type of query satisfies second criteria that corresponds to a second threshold level of search ranking movement, wherein the GUI includes, as part of the ranked list of notifications based on the second type of query having achieved the second threshold level of search ranking movement, an indication that the second search ranking of the webpage for the second type of query has changed.

Embodiment B19 is the computing system of any one of embodiments B17 through B18, wherein the operations further include: determining, by the computing system, a first ranking for the indication that the search ranking of the webpage for the type of query has changed, within the list of ranked notifications presented by the GUI, based on total estimated traffic to the webpage from queries of the type of query, wherein the GUI presents the indication that the search ranking of the webpage for the type of query has changed at a first position within the list of ranked notifications that is based on the first ranking; and determining, by the computing system, a second ranking for the indication that the second search ranking of the webpage for the second type of query has changed, within the list of ranked notifications presented by the GUI, based on total estimated traffic to the webpage from queries of the second type of query, wherein the GUI presents the indication that the second search ranking of the webpage for the second type of query has changed at a second position within the list of ranked notifications based on the second ranking.

Embodiment B20 is the computing system of any one of embodiments B17 through B19, wherein each notification that is presented by the GUI in the ranked list of notifications comprises an indication that a search ranking of the webpage for a corresponding type of query has changed.

The devices, system, and techniques described herein may provide one or more of the following advantages. For example, the disclosed techniques provide robust insights to help the customer focus on improvements in particular areas of SEO. The insights can be used to drive traffic and engagement of the customer's website with the right audience (e.g., end users). The web analysis server system can use minimum compute resources by receiving data from various different web analysis services, third party services, and other computing systems that analyze the customer's website, and synthesizing the received data to generate targeted SEO insights for the customer. The web analysis server system can assess multiple data points to provide value-based insights to the customer. The targeted SEO insights can therefore provide for intelligent prioritization of business goals for the customer. The insights can be presented in a coherent insight stream (e.g., list of notifications). From the customer's perspective, the insights presented in the coherent stream can provide conceptual understanding of how the website is performing in terms of SEO and what targeted actions can be taken to further optimize performance. User-friendly and visually appealing graphical user interfaces (GUIs) make it easy for the customer to navigate the insights and address them.

Moreover, insights can be determined in an efficient and consistent way. Analyzing quality of an entire website and its content across multiple different factors can use a large number of processor cycles. The technology described herein permits for the number of processor cycles that are used to determine insights to be minimized, thus optimizing the processing efficiency of the insights determinations. Additionally, efficiencies that are gained permit for real-time, dynamic website assessments and insights to be generated from robust datasets, which can allow customers to evaluate performance of their websites, to respond quickly to optimize performance, and to improve user experiences with the website.

In another example, GUIs and specific GUI features can be provided to assist customers in readily and quickly understanding a website's performance in search engines. Such GUI features can permit for complex information to be presented in a simplified manner, permitting for it to be provided on a single screen that can readily be reproduced on a mobile computing device and/or other smaller form factor display. Additionally, by automatically and dynamically identifying and displaying ways in which the customer can improve website performance in the realm of SEO, the disclosed systems and techniques can assist the customer to more efficiently improve their website.

The details of one or more implementations are set forth in the accompanying drawings and the description below. Other features and advantages will be apparent from the description and drawings, and from the claims.

BRIEF DESCRIPTION OF THE DRAWINGS

FIG. 1 is an example GUI for displaying insights in a list of notifications.

Like reference symbols in the various drawings indicate like elements.

DETAILED DESCRIPTION OF ILLUSTRATIVE EMBODIMENTS

Figure 2:
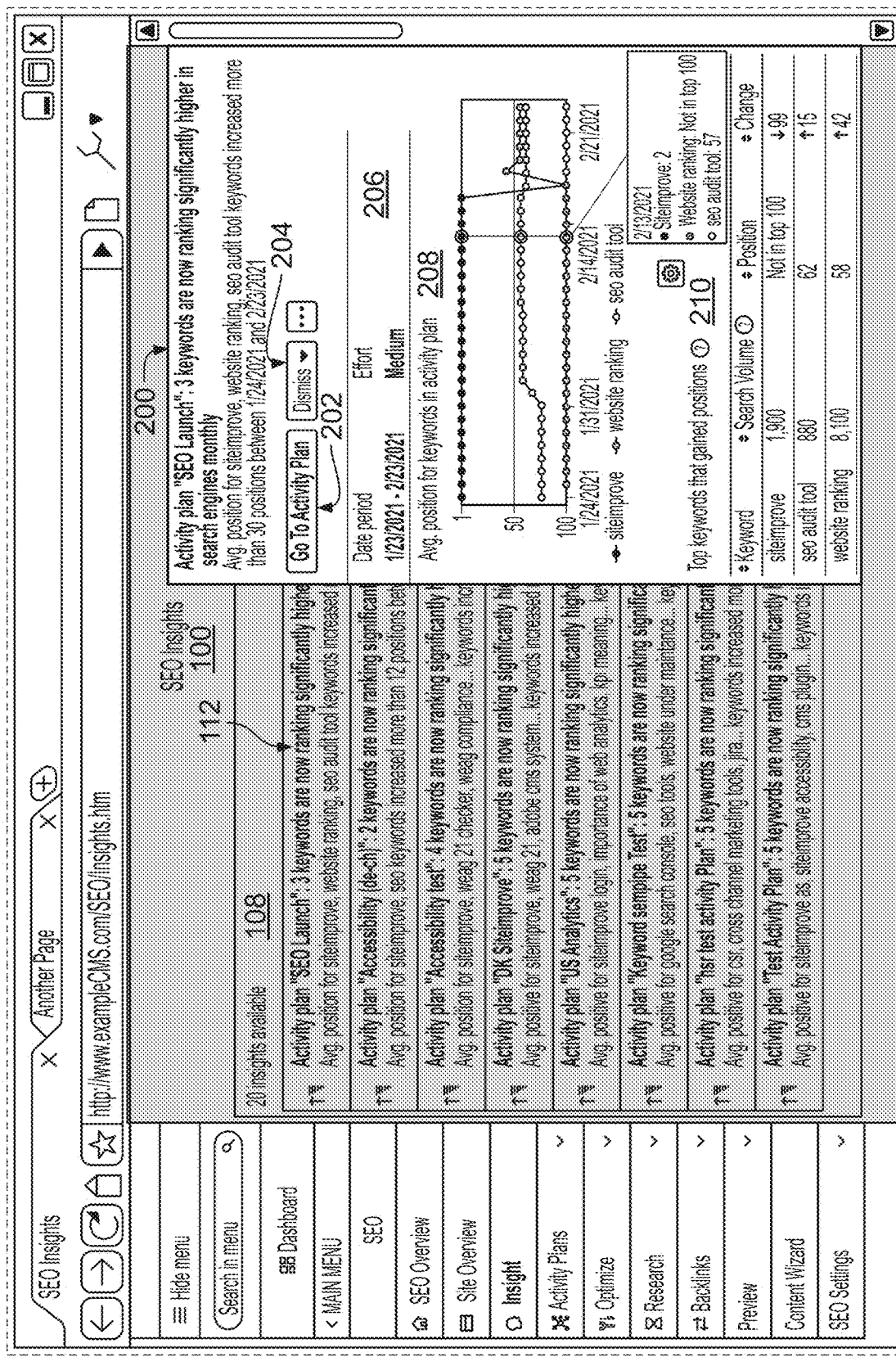
FIG. 2 is an example GUI for displaying information about a particular insight that is based on a customer-defined activity plan.

This document generally relates to assessing and improving website quality based on SEO analysis. A web analysis server system can generate SEO insights based on analysis of data from multiple different sources about website performance in the realm of SEO. Insights can be generated by a retrospective lookback function. The web analysis server system can determine whether the customer's website performs better or worse in terms of one or more types of queries over a past predetermined amount of time (such as a past 30 days). If the website performs worse, the web analysis server system can generate one or more insights with suggestions for improving the customer's website performance. The web analysis server system may also use predictive algorithms to project how the customer's website will perform during some future period of time.

In some implementations, insights can be generated about advertisements/campaigns (e.g., ads) and SEOs using the disclosed techniques. SEO and ads insights can be combined and prioritized in a list of notifications within a single GUI/view. Data pertaining to both SEO and ads may also be combined by the web analysis server system to generate unified insights information that can be used by the customer to further optimize the website's performance. The SEO and ads insights may also be presented in separate lists of notifications, in some implementations. The SEO insights can provide valuable information about where the customer's website and/or webpage(s) rank in terms of SEO. The ads insights can provide valuable information about how much money the customer is spending to attract end users to their website and/or webpage(s). The synthesis of SEO and ads can therefore provide valuable insight about whether and how the customer can combine purchasing of ads with organic positioning in search engine results to achieve and maintain business goals.

Figure 1:
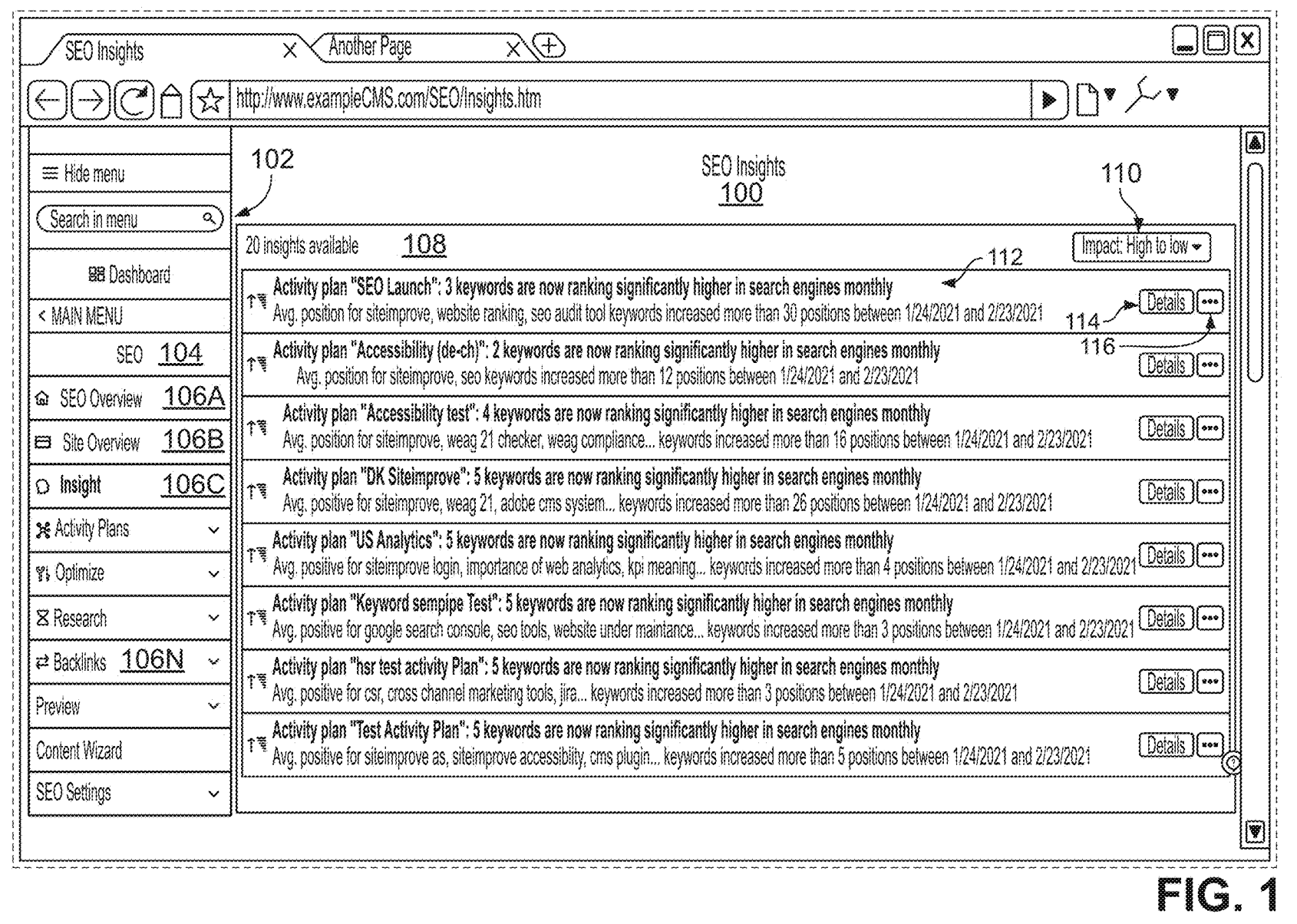

Referring to the figures, FIG. 1 is an example GUI for displaying insights in a list of notifications. A web analysis server system (e.g., refer to web analysis server system 500 in FIG. 5) can provide customers, such as website owners, website operators, clients, and other relevant users with different types of services for creating, reviewing, analyzing, and updating websites. The services can be used to assess website quality. The services can also be used to assess performance of the websites in search engine results and rankings. The services can be presented in a web browser at a client computing device of the customer (e.g., refer to client computing device 502 in FIG. 5). The customer can toggle between different modules/tools presented in the web browser to review and respond to different aspects of the customer's website.

Here, an SEO insights GUI 100 is presented in the web browser. The customer can toggle between different modules/tools/GUIs by selecting options in menu 102. The customer is accessing/using "SEO" module 104. The module 104 include a list of selectable links 106A-N in the menu 102. For example, the customer can select and view "SEO Overview" 106A, "Insights" 106B, "Activity Plans" 106C, and "Backlinks" 106N. One or more other selectable options are presented and can be included for the module 104 in the menu 102. In the example of FIG. 1, the customer has selected "Insights" 106B, which causes the web analysis server system to present the SEO insights GUI 100 in the web browser at the customer's client computing device.

Figure 4:
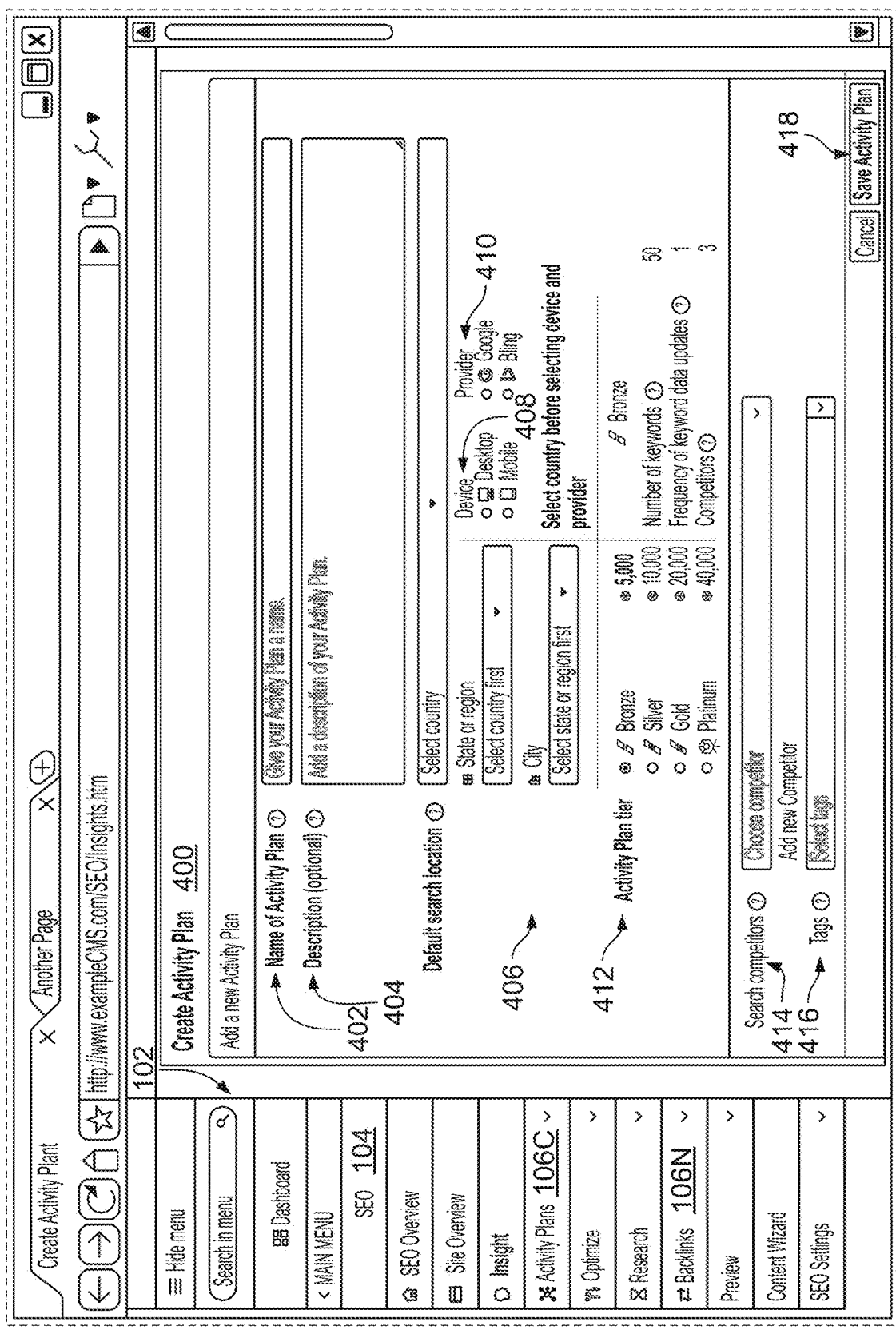
FIG. 4 is an example GUI for customer creation of an activity plan.

The SEO insights GUI 100 includes a section 108 where a list of notifications are presented. Each notification in the list can pertain to a different insight that has been generated by the web analysis server system. The insights can be generated by executing activity plans (also referred to as "types of queries") that are created by the customer. The activity plans can be reviewed and/or created by selecting "Activity Plans" 106C in the menu 102. The customer can create activity plans to execute different types of SEO searches that may be specific for particular webpages, products available on the customer's website, user groups, and/or particular aspects of SEO. Refer to FIG. 4 for additional discussion about creating the activity plans.

The web analysis server system can generate various types of insights. For example, an insight can be related to visibility, which pertains to how visible the customer's website is in search results for keywords associated with a particular activity plan compared to the customer's competitors. Another insight can be keyword monitoring, which pertains to tracking and monitoring performance of important keywords of the customer's website relative to the customer's business goals. The web analysis server system can provide SEO keyword suggestions that allow the customer to find new keyword ideas relevant to their particular focus area and/or business goals. Therefore, the customer can investigate keywords that they want to rank on in search engine results and also receive suggestions for related keywords to enrich the customer's type of query and improve performance of their website. In an activity plan, for example, the customer can define a geographic location, type of device, and search engine to analyze, by the web analysis server system or by third party systems that are in communication with the web analysis server system, to generate keyword insights. The keyword insights can provide valuable information about search volume and/or search volume trends based on the information provided by the customer in the activity plan.

Another insight can be for search engine analytics. The web analysis server system can review analytics data about incoming search engine traffic and determine how well the traffic contributes to the customer's business goals. The web analysis server system may also assess key performance indicators (KPIs) related to search engine traffic to generate robust insights for the customer. The web analysis server system can generate insights about key metrics conversion data related to traffic from search engines, statistics about visitors from search engine referrers, search engines device and country statistics, and/or search engines landing page analytics.

Yet another insight can be for content optimization. The web analysis server system can map keywords to where they should appear in the customer's website content and generate targeted recommendations on how to optimize content for the customer's keywords. For example, the web analysis server system can automatically generate recommendations for fixing content issues based on data about the customer's keywords and target pages to optimize performance in search engine results. Similarly, for target page optimization, the web analysis server system can automatically generate recommendations for optimizing and fixing target page issues.

Another insight can be for competitor analysis. The web analysis server system can analyze how well the customer's website ranks for keywords (e.g., customer-defined keywords in one or more activity plans) compared to the customer's main online search competitors. The web analysis server system can analyze a visitor traffic comparison between the customer's website and their search competitors for monitored keywords, estimated traffic for the monitored keywords, the customer's search engine visibility versus their competitors' search engine visibility, and monitored keywords ranking compared with competitors. The web analysis server system may also provide customers with flexibility to rank trends and pages for different online competitors and sort through data related to the competitors. For example, the customer can sort through the data to view competitors that are rising in rank, falling in rank, and rising quickly in rank.

Another insight can be for target webpage metrics. The web analysis server system can retrieve and/or determine visitor statistics for landing pages that target specific keywords. The web analysis server system can provide insights about how the customer can improve traffic to the landing pages.

Another insight can be for focus issues. In an activity plan, the customer can define and/or select a particular SEO issue, or focus issue, to assess by the web analysis server system. The web analysis server system can accordingly generate insights about assessment of the focus issues.

In some implementations, an insight can be for determining whether the customer's website is connected to a third party search console. The third party search console can provide tools and reports to help the customer measure their website's search traffic and performance. The third party search console can provide additional tools for the customer to fix issues in their website and make their website perform better in search results provided by the third party.

In yet some implementations, an insight can be for determining a sitemap for the customer's website. For example, the insight can be used to determine whether the customer has submitted XML for their website to the web analysis server for generation of a sitemap. If the customer has not submitted the XML, then the insight can provide a use-selectable option for the web analysis server system to automatically generate an XML sitemap for the customer's website.

As another example, an insight can be reviewing a subset of webpages in the customer's website based on duplicate content. The subset of webpages can be a set of key pages that are identified using key pages criteria that are generated by the customer. The web analysis server system can identify any webpages in the customer's website that satisfy the key pages criteria and tag the identified webpages as key pages. This insight can then be used to check that the subset of webpages (e.g., the identified key pages) are not duplicated across the website. This insight may only apply to key pages or particular subsets of webpages, not all webpages of the customer's website. Another insight, as described herein, can be for reviewing new webpages, modified webpages, or any other webpages in the customer's website for duplicate content.

As yet another example, and similar to one or more previously described insights, an insight can provide keyword research and promotion of certain keywords to be part of an activity plan for the customer's website. Similar to suggesting keywords for an activity plan, this insight can provide for determining a potential of a keyword to be used for an activity plan. With this insight, a keyword can be assigned a potential metric (e.g., a numeric value), which can indicate how important the keyword may be for the customer's website and/or business. The potential metric can be converted or otherwise correlated to a string value of low, medium, high, and very high. The string value can be presented to the customer in the insight. A value of low indicates that the keyword is not that important to the customer's website and/or business and a value of very high indicates that the keyword is highly relevant/important to the customer's website and/or business. The customer can decide, based on the information presented in this insight, whether to promote the keyword in an activity plan for the customer's website.

One or more additional insights can be generated by the web analysis server system, as outlined below in Table 1.

TABLE 1

SEO insights

| | INSIGHT 1 |
|---|---|
| Insight title | Keywords in Activity Plan "[activity plan]" are ranking higher/lower |
| Insight type | Informative |
| Why it's important | Help users keep an eye on the progress they are making with their SEO efforts. |
| | If a positive change happens, make it easier for users to show this progress to their team/managers. |
| | If a negative change happens, notify users about it and easily be able to troubleshoot and improve their performance. |
| User stories | As a user, I want to . . . |
| | Be notified if a keyword in my Activity Plan is performing significantly worse, so that I can figure out why and make changes towards performing better. |
| | Be notified if a keyword in my Activity Plan is performing significantly better, so that I can report this positive change to management. |
| Desired outcome | Increase traffic towards Activity Plans X much by X date |
| | Increase number of exports of Activity Plan data by X much by X date |
| Triggers | When a keyword or keywords in an Activity Plan rank higher or lower compared to 30 days ago. |
| Actions | The user can . . . |
| | Go to the Activity Plan so that they can share progress with others (create a report, export, etc) |
| | Go to the Activity Plan so that they can troubleshoot and eventually improve the performance of their page - fix SEO issues, improve their content, etc. |
| | INSIGHT 2 |
| Insight title | Review [# of backlinks] new low-value backlinks |
| Insight type | Informative |
| Why it's important | Low-value backlinks are damaging to an SEO, as they lower the trustworthiness of the website, thereby causing lower rankings. |
| User stories | As a user, I want to . . . |
| | Be notified when I have new low-value backlinks. |
| | Understand why low-value backlinks are damaging to my SEO. Understand what to do about low-value backlinks (disavowing them). |
| Desired outcome | Customers have 0 low-value backlinks by [date]. |
| Triggers | This insight triggers when new low-value backlinks are compared to 30 days ago. |
| Actions | The user can . . . |
| | Read about why low-value backlinks are damaging. |
| | See which backlinks they have gained and assess if they should be disavowed or not. Read about how to disavow backlinks in a search engine. |
| | INSIGHT 3 |
| Insight title | Connect web analysis server system to data features of a search engine |
| Insight type | Initiating |
| Why it's important | Encourage users to connect with search features of a search engine, which allows them access to data that speaks to the performance of their keywords and pages. |
| | Data features of the search engine can be used to properly report on SEO efforts, view the impact that website changes have on clicks, impressions, and click-through rates. Based on the data |

TABLE 1-continued

SEO insights

|  |  |
|---|---|
|  | features, recommendations can be made on keywords that might be worth adding to the user's SEO strategy (e.g., keywords that are performing well but are not added to Activity Plans). Users are not connecting enough sites to the data features of the search engine. |
| User stories | As a user, I want to . . . Be informed that my site is not connected to the data features of the search engine. Have the benefits of connecting to data features of the search engine described and demonstrated to me. Be able to easily connect my site to data features of the search engine from an Insight Details panel. |
| Outcome | SEO customers' main sites to be connected to data features of the search engine by [date]. |
| Triggers | When the customer's account is not connected to data features of the search engine. |
| Actions | When reading the Insight, the customer can: Decide if they want to connect to data features of the search engine Needs to log in with admin credentials to allow the integration. |

INSIGHT 4

|  |  |
|---|---|
| Insight title | Add keyword "[keyword]" to an Activity Plan |
| Insight type | Actionable |
| Why it's important | Highlighting keywords that have high potential but are not yet part of an Activity Plan is a way of helping the user discover keywords that are not currently part of their SEO strategy. With the keyword potential metric, the following can be highlighted: branded keywords that the user's website is not ranking the highest for (e.g., competitors may be ranking higher). a long-tail keyword with little competition for the high positions a keyword with high search volume where the user's website is in high positions |
| User stories | As a user, I want to . . . Be notified of new keywords that might be interesting to add to my SEO strategy. Understand why this keyword has high potential for my organization (e.g., what does "high potential" mean?) Be helped to decide which Activity Plan this keyword should be added to. Be able to quickly and easily add the keyword to an Activity Plan (new or existing). |
| Outcome | Users add all "very high" potential keywords to their Activity Plans. |
| Triggers | When keywords with "very high" potential are identified, based on estimated traffic. |

INSIGHT 5

|  |  |
|---|---|
| Insight title | Submit a sitemap for your website |
| Insight type | Informative |
| Why it's important | A sitemap is a file that informs search engines about the pages, videos and other files on the website and the relationships between them. Given this file, a search engine can crawl and index the website more efficiently. Not having a sitemap could mean that important pages and content are not being indexed, which effects the website's visibility in the search engine. |
| User stories | As a user, I want to . . . be made aware if my site does not have a sitemap. be made aware of what a sitemap is and why it's important for my SEO. be informed of the different ways of building and maintaining a sitemap. be able to create a basic sitemap from the web analysis server system. be informed how to submit a sitemap to the search engine. |
| Outcome | Users have an XML sitemap by [date]. |
| Triggers | When the web analysis server system cannot locate a sitemap for the website. |
| Actions | 1. If the customer has built a sitemap, they must ensure it has been submitted properly. 2. If the customer has not built a sitemap, they must assess whether the particular sites needs a sitemap. 3. If a sitemap is needed, gather resources needed in order to build a sitemap. 4. Build and submit: a. Extract sitemap from CMS and submit to the search engine. b. Download sitemap from web analysis server system and submit to the search engine. |

TABLE 1-continued

SEO insights

INSIGHT 6

| | |
|---|---|
| Insight title | Target pages with duplicate content |
| Insight type | Informative |
| Why it's important | Duplicate content confuses search engines and causes webpages to compete against each other for rankings. Target pages suffer from this as these are deemed particularly important for driving traffic to the website.<br>Causes for having duplicate content can be:<br>Having similar mobile and desktop versions of a page.<br>Having similar versions of the webpage for different markets (US and UK).<br>Re-using content on several pages. |
| User stories | As a user, I want to . . .<br>Be informed if I have pages duplicating my target pages.<br>Be informed why duplicate content can be damaging to my SEO.<br>Be informed of what I can do to mitigate bad SEO due to duplicate content on my site. |
| Outcome | Do not have any webpages flagged as duplicating target pages by [date]. |
| Triggers | When a target page has >60% similarity to other pages and these pages do not have no- index, no-follow, hreflang or canonical tags. |
| Actions | Depending on the issue, the customer can . . .<br>Edit the page content (editor)<br>Add canonical tags to the target page (dev)<br>Add hreflang tags to a page (dev)<br>Add no-follow or no-index tags to a page (dev) |

INSIGHT 7

| | |
|---|---|
| Insight title | Add new high-value keyword to an Activity Plan |
| Insight type | Quick win |
| Why it's important | See above insight for adding new keywords to an activity plan |
| User stories | See above insight for adding new keywords to an activity plan |
| Outcome | See above insight for adding new keywords to an activity plan |
| Triggers | The insight highlights keywords with potential = high *.<br>Based on the new keyword potential metric. |
| Actions | The user must assess if the keywords is relevant (e.g., does it generate traffic to important pages)?<br>If yes, determine which Activity Plan the keyword should be added to based on the pages it drives traffic to.<br>Add the keyword to an existing or new Activity Plan. |

Still referring to FIG. 1, the customer can select dropdown menu 110 to sort how the notifications are presented in the list in the section 108. Here, the customer has selected "Impact: High to low" from the dropdown menu 110. The customer can also select "Impact: Low to high" from the dropdown menu 110 to sort the notifications in the section 108 from lowest to highest priority value. The default selection from the menu 110 can be "Impact: High to low." As a result, the web analysis server system has updated the list of notifications in the section 108 to display the notifications from highest impact to lowest impact. The list of notifications can be default sorted by impact. Each notification can be assigned a priority value by the web analysis server system. The priority value can be determined by the web analysis server system based on determining an impact that a particular activity plan may have on the overall website. The priority value can be a number on a scale of 0.0 to 1.0. One or more other scales may also be used. The priority value can then be used to mix and display insights from various services in a singular feed (the list of notifications).

Figure 3:
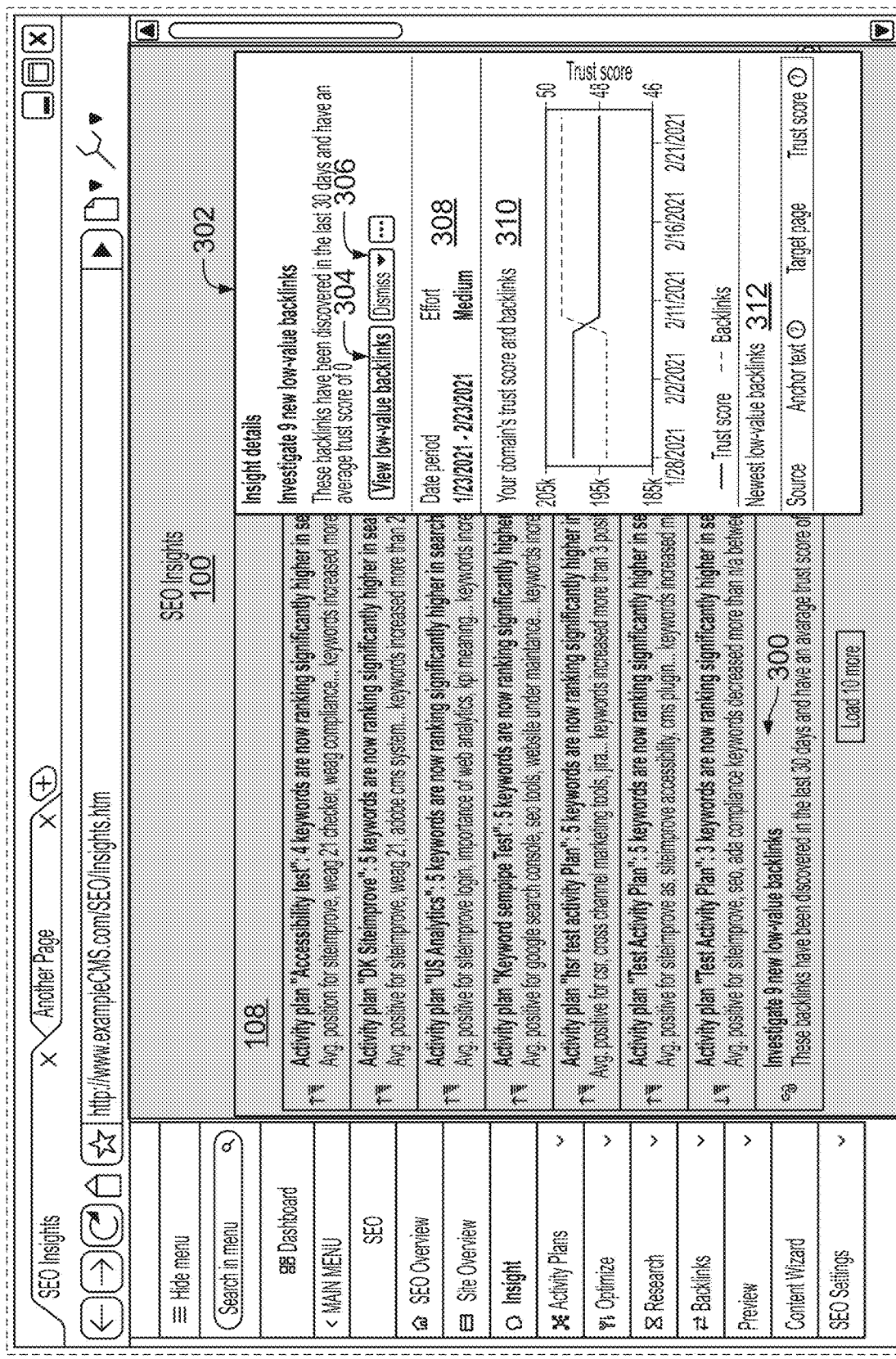
FIG. 3 is an example GUI for displaying information about another type of insight that is selected from the list of notifications of FIG. 1.

The customer may also select any of the notifications presented in the list in the section 108, such as notification 112. Selecting a notification can cause the web analysis server system to update the GUI 100 with a pop out window displaying information about the selected notification. Refer to FIGS. 2-3 for additional discussion. The customer can also select a "Details" option (e.g., button) 114 to present additional information about the selected notification (e.g., insight), such as in pop out window 200 in FIG. 2.

The customer may also select a " . . . " option 116 to perform some action in response about the selected notification (e.g., insight). The customer can select, for example, an option to prioritize the selected notification. Prioritizing the selected notification can cause the insight to be a fixed insight, which means the insight can be continuously viewed by the customer in the section 108. The customer can then view the insight over time to see how the insight has developed on a daily basis. The customer can also select an option to dismiss the selected notification. The notification can be dismissed for seven days or any other desired period of time. The notification can then be presented in the section 108 again once the seven days or other period of time ends. The notification can also be dismissed for an extended period of time, in which the insight associated with the dismissed notification no longer will appear in the section 108.

The customer can perform one or more actions on the notifications that are listed in the section 108. For example, the customer can select options to prioritize insights in the section 108. In some implementations, the customer can select how to prioritize the insights from one or more other GUIs. By selecting to prioritize an insight, the web analysis server system can mark the insight in the list with a favorite icon (e.g., star or other graphical element), but the list order may not be influenced (sorting by impact may overrule). The web analysis server system may also duplicate the insight to the top of a prioritized tab list (not depicted). The web analysis server system can also generate a message that is displayed at the top of the GUI 100 that says, "Insight has been prioritized. View prioritized insights (link)." In some examples, selecting to prioritize an insight can cause the web analysis server system to weight ranking scores generated for insights of the same type with greater weight, so that insights of the type are likely to be ranked higher in section 108 in the future.

As another example, the customer can select options to deprioritize insights in the section 108. By selecting to deprioritize an insight, the web analysis server system can remove the favorite icon from the insight (the list order is not affected), remove the insight from the prioritized tab list, and/or generate a message that is displayed at the top of the GUI 100 that says, "Insight has been removed from prioritized." In some examples, selecting to deprioritize an insight can cause the web analysis server system to weight ranking scores generated for insights of the same type with lower weight, so that insights of the type are likely to be ranked lower in section 108 in the future.

As another example, the customer can select options to dismiss an insight. By selecting to dismiss an insight, the web analysis server system can remove the insight from the list (and put the insight in a "Dismissed" tab). The web analysis server system can also generate and present a message in the GUI 100 that says, "Insight has been dismissed. View dismissed insights (link)." On the "Dismissed" tab, the insight can be added to the top of a list of dismissed insights with a timestamp indicating a data that the insight was dismissed. When an issue is dismissed, it may not be prioritized. In some implementations, the customer can select options to remove the insight from the dismissed list in the "Dismissed" tab. The web analysis server system can generate and present a message that says, "Insight has been removed from dismissed list and will be recalculated." Therefore, if an insight is being reverted from the dismissed list, it can be recalculated to see if it still applies and therefore satisfies criteria to be shown as an insight to the customer in the section 108 in the GUI 100. If the issue still applies as an insight, the web analysis server system can add it to the list in the section 108, sorted based on impact.

FIG. 2 is an example GUI for displaying information about a particular insight that is based on a customer-defined activity plan. Here, the customer has selected the notification 112 presented in the section 108 of the SEO insights GUI 100. Selecting the notification 112 caused the web analysis server system to present a pop out window 200 in the GUI 100. The pop out window 200 can overlay a portion of the section 108 and/or other content presented in the GUI 100.

The pop out window 200 displays information about an insight that corresponds to the selected notification. The information can be determined by the web analysis server system and can explain the insight, provide suggested actions that can be taken by the customer to improve/optimize the website's performance in relation to the insight, and a timeline of past, current, and/or projected website performance based on the insight.

In FIG. 2, the selected notification 112 pertains to "Activity plan 'SEO Launch'." The insight that has been generated by the web analysis server system is: "3 keywords are now ranking significantly higher in search engines monthly." The pop out window includes "Go to Activity Plan" option 202 (e.g., button) and a dropdown menu 204. The customer can select the option 202 to be redirected to a GUI display of the Activity Plans associated with the customer's website and/or user account. The customer can modify the "Activity Plan 'SEO Launch'." The customer can also view additional information about this plan.

The customer can select an option from the dropdown menu 204 to perform some action in response to the insight presented in the pop out window 200. As described above in reference to FIG. 1, the customer can select an option to "Dismiss" the insight. The customer may also select an option to "Prioritize" or "Deprioritize" the insight.

The pop out window 200 can also include information 206, which can indicate a timeframe for which the activity plan was executed to generate the insight. The information 206 can also indicate an amount of effort. In some implementations, the amount of effort can correspond to an amount of effort needed for the customer to implement one or more changes that are based on the insight.

The pop out window 200 can also present a graph 208. The graph 208 here indicates an average position for keywords in the activity plan. The graph shows the average position of the keywords over the timeframe indicated in the information 206. In some implementations, the graph 208 can show the average position of the keywords during prior periods of time and/or future periods of time. When the customer hovers over any data point in the graph 208, additional information can be presented in a smaller pop out window over the graph 208. The smaller pop out window can indicate, on a particular day, a ranking for each keyword that is graphed.

Moreover, the pop out window 200 can include a table 210. The table can indicate top keywords that gained positions (and/or lost positions) during the timeframe indicated in the information 206. The table 210 can include columns for attributes including but not limited to "Keyword," "Search volume," "Position," And "Change." The customer can sort information presented in the table 210 by any of the abovementioned attributes.

FIG. 3 is an example GUI for displaying information about another type of insight that is selected from the list of notifications of FIG. 1. Here, the customer has scrolled down in the section 108 to view more insights that are ranked in the list of notifications. The customer selected notification 300. Selecting the notification 300 causes the web analysis server system to present a pop out window 302 in the SEO insights GUI 100. The pop out window 302 is similar to the pop out window 200 described in FIG. 2.

The notification 300 corresponds to an insight for low-value backlinks. This insight may not be generated based on execution of any activity plan created by the customer. Instead, this insight can be generated based on routine crawling (by the web analysis server system, a web analysis service, and/or some third party system) the customer's website. Backlinks may point to particular webpages of the customer's website, which can have a negative effect towards the website's SEO ranking if the backlinks are low-value. Identifying new low-value backlinks over some period of time (such as a past 30 days) can be beneficial to provide insights and suggestions about removing those new low-value backlinks to improve the customer's search rankings.

In the example of FIG. 3, the insight provided in the pop out window 302 is "Investigate 9 new low-value backlinks."

The pop out window 302 includes a "View low-value backlinks" option 304 and a dropdown menu 306. Selecting the option 304 can cause the web analysis server system to present another GUI in the web browser for viewing and addressing the low-value backlinks. The another GUI can be provided by the web analysis server system, some third party web analysis service, and/or a content management service (CMS) system. The dropdown menu 306 can be the same as the dropdown menu 204 in FIG. 2.

The pop out window 302 also includes information 308, which indicates a timeframe associated with the insight and an effort level associated with the insight. Refer to FIG. 2 for additional discussion.

The pop out window 302 can further include a graph 310. The graph 310 can indicate the customer's domain trust score and backlinks. The graph 310 shows that over the timeframe indicated in the information 308, the trust score for the customer's domain decreased as the quantity of low-level backlinks increased.

Additionally, the pop out window 302 can include a table 312. The table 312 can include entries for the new low-value backlinks that were identified during the timeframe indicated in the information 308. The table 312 can include columns for attributes such as "Source," "Anchor text," "Target page," and "Trust score."

FIG. 4 is an example GUI for customer creation of an activity plan. As described herein, the customer can create different types of activity plans. Activity plans are synonymous with types of queries. The customer can select "Activity Plans" 106C from the menu 102 to view, create, modify, and/or delete activity plans that are associated with the customer's user account. GUI 400 can be presented in the web browser, by the web analysis server system, when the customer selects an option to create an activity plan. The customer can provide input in the GUI 400 that can be saved as a new activity plan. The activity plan can then be executed by the web analysis server system (or sent to a third party system for execution) to generate insights associated with the activity plan.

An activity plan is a tool that can provide a workflow for engaging with different aspects of SEO to achieve and maintain the customer's website goals. The activity plans can be used to monitor and improve search engine visibility. Activity plans can also be benchmarked amongst each other based on metrics such as visibility, total estimated traffic, keyword count, and average keyword position. The customer can customize activity plans for traffic in specific geographic regions, types of users or groups of users, specific products available on the website, and/or technical aspects of SEO, like sitemaps and structured markup.

Referring to the GUI 400, the customer can provide input for a name 402 and description 404 of the new activity plan. The customer can also provide input for a default search location 406 for which to monitor particular keywords associated with the activity plan, which can be based on country, state or region, and/or city. The customer can provide input for a device type 408 (e.g., desktop or mobile) and search engine provider 410 (e.g., GOOGLE, BING, etc.).

The customer can also select an activity plan tier 412. Each tier can provide additional features and/or flexibility to the customer. For example, the higher the tier (e.g., diamond, platinum), the more insights the customer can receive per month, the more keywords the customer can select for monitoring, and/or the more competitors that the customer's website can be searched against.

The customer can also select options from dropdown menu 414 for competitors to search against. The competitors can be listed in the dropdown menu 414. The customer can also select an option "Add new competitors" to manually input competitors.

The customer can optionally select and/or add tags using dropdown menu 416. Adding tags can be beneficial to group activity plans together (and thus generated insights), especially when the customer has many activity plans for one website.

In some implementations, the customer can add one or more keywords to monitor when creating the new activity plan in the GUI 400. In some implementations, after the customer selects a "Save Activity Plan" option 418, the customer can add the keywords to the activity plan in another GUI presented in the web browser. The customer can add keywords that they would like monitored with the activity plan. Optionally, the customer can also add landing pages that should target those keywords.

In some implementations, the customer may also add focus issues to the activity plan in the GUI 400 or another GUI. Focus issues can be specific SEO issues that the customer wants to direct their efforts on addressing/optimizing. An example focus issue can be website readability. An activity plan can have one or more focus issues for which the web analysis server system can focus on providing insights.

Figure 5:
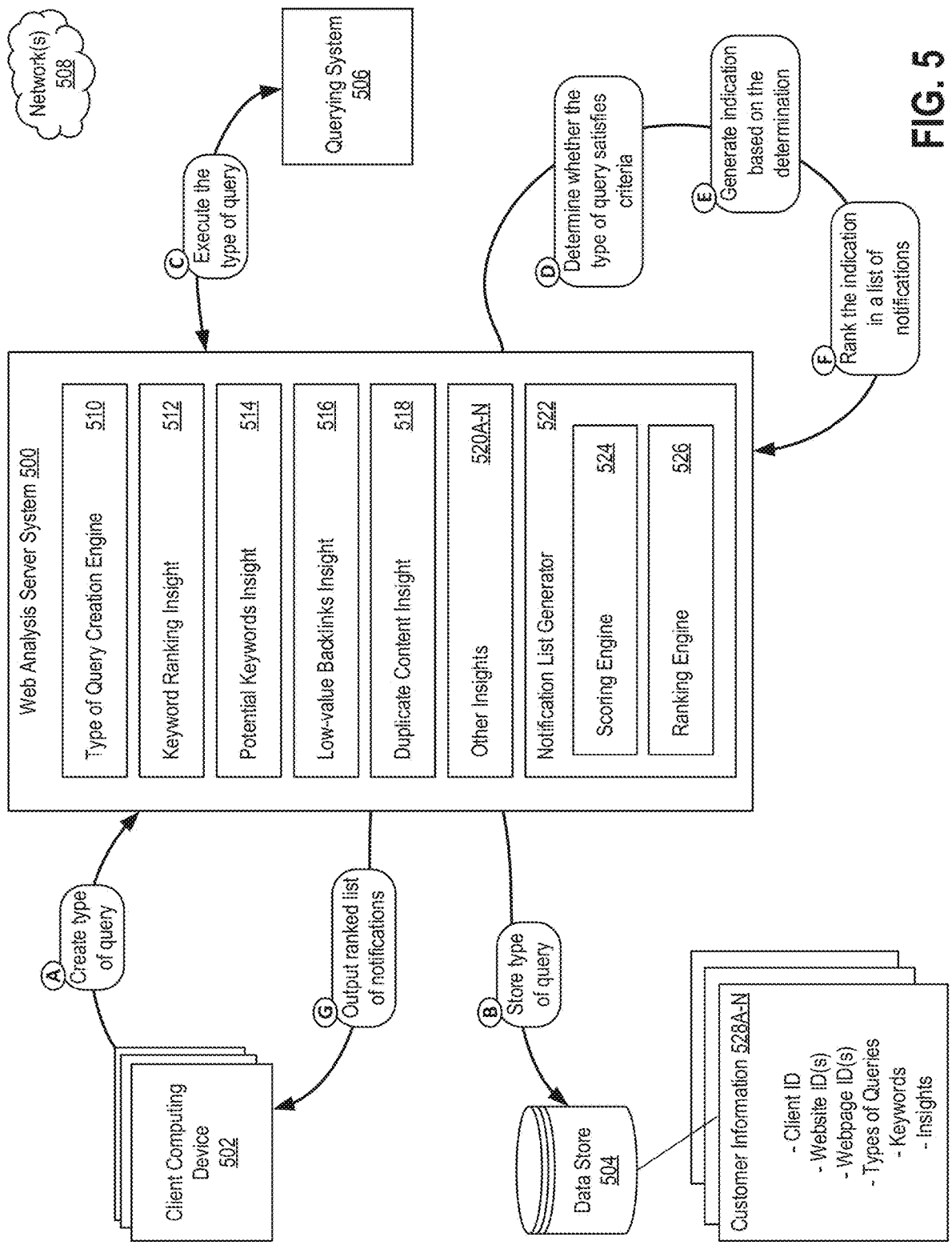
FIG. 5 is a conceptual system diagram of components that can perform the techniques described herein.

FIG. 5 is a conceptual system diagram of components that can perform the techniques described herein. A web analysis server system 500, client computing devices 502, data store 504, and querying system 506 can be in communication via network(s) 508.

In brief, the web analysis server system 500 can be any type of computing system, such as a computer or network of computers, and/or a cloud-based computing system and/or service. The client computing device 502 can be any type of user device or computing device, including but not limited to a computer, laptop, tablet, cellphone, mobile phone, and/or smartphone. Each client computing device 502 can be operated and used by a customer, client, website operator, or other relevant user who is associated with a user account for services provided by the web analysis server system 500.

The data store 504 can be any type of storage device, including but not limited to cloud storage, a data lake, and/or a database. The data store 504 can maintain information about customers, such as customer information 528A-N, and websites that are assessed by the web analysis server system 500. The customer information 528A-N may include, but is not limited to, client ID, website ID(s), webpage ID(s), types of queries (e.g., activity plans), keywords, and insights.

The web analysis server system 500 can be configured to analyze websites, determine quality scores for the websites, identify issues in the websites, and provide the customer with tools to assess and improve their website(s). As described herein, the web analysis server system 500 can provide customers with tools, modules, and/or services to assess website performance in terms of SEO, and generate insights and suggestions to improve the website performance and achieve business goals. Thus, the web analysis server system 500 can include a type of query creation engine 510, a keyword ranking insight 512, a potential keywords insight 514, a low-value backlinks insight, a duplicate content insight 518, other insights 520A-N, and a notification list generator 522.

A type of query, or activity plan, can be created by the customer at the client computing device 502 and transmitted to the web analysis server system 500 (step A). The customer can provide inputs to the type of query creation engine 510 of the web analysis server system 500 to create the type of query. Refer to FIG. 4.

The web analysis server system 500 can store, in the data store 504, the type of query in the customer information 528A-N that corresponds to a user account associated with the customer at the client computing device 502 (step B).

The web analysis server system 500 can execute the type of query (or multiple types of queries) in step C. For example, the web analysis server system 500 can transmit the type of query to the querying system 506 to execute the type of query. The querying system 506 can be a third party server, a third party search engine, one or more web analysis services, an SEO system, or other computing systems that can collect and analyze a variety of data about the customer's website. The querying system 506 can transmit data/results from executing the type of query back to the web analysis server system 500 (step C). For example, the querying system 506 may be associated with many remote computing devices that can query various search engines from different locations with different keywords defining content of the queries, and store and analyze search results received in response to submitting the queries.

Using the data results from the querying system 506, the web analysis server system 500 can determine whether the type of query satisfies criteria (step D). Satisfying the criteria can result in generation of an insight that pertains to the type of query. Refer to FIGS. 6-9 for additional discussion about determining whether the type of query satisfies the criteria. Next, the web analysis server system 500 can generate an indication based on the determination in step E. The indication can be a notification presented in a list of notifications, where each notification pertains to a particular insight that was determined in step D. Refer to FIGS. 1-3 for additional information about the indication.

Steps D-E can be performed by one or more of the keyword ranking insight 512, the potential keywords insight 514, the low-value backlinks insight 516, the duplicate content insight 518, and/or other insights 520A-N. For example, the keyword ranking insight 512 can determine whether the type of query satisfies criteria for a keyword falling lower in search engine rankings over a period of time (such as a past 30 days), which indicates the keyword is performing poorly. The insight 512 can then generate an indication to that effect with one or more suggestions for improving the keyword ranking.

As another example, the potential keywords insight 514 can identify high ranking/popular keywords that are not designated in the type of query but can be. The insight 514 can generate an indication to that effect with one or more suggestions to add the potential keywords to the type of query to improve website performance.

The low-value backlinks insight 516 can identify new low-value backlinks to the customer's website over a period of time (such as the past 30 days). The insight 516 can make this identification automatically, without executing the type of query or any type of query. The insight 516 can generate an indication of the identified low-level backlinks and one or more suggestions to remove (e.g., disavow) these backlinks.

The duplicate content insight 518 can identify webpages of the customer's website, such as target webpages, that have duplicate content with other webpages of the customer's website. The insight 518 can make this identification automatically, without executing the type of query or any type of query. The insight 518 can generate an indication of the identified webpage(s) having duplicate content and one or more suggestions to remove the duplicate content.

The one or more other insights 520A-N can generate insights about any other types of queries and/or focus issues (e.g., SEO issues) described throughout this disclosure.

Once the indication(s) is generated in step E, the web analysis server system 500 can rank the indication in a list of notifications (step F). More particularly, the notification list generator 522 can be configured to rank the indication in the list of notifications. The generator 522 can include a scoring engine 524 and a ranking engine 526. The scoring engine 524 can be configured to assign scores and/or priority values to each of the indications (e.g., insights) to be presented in the list of notifications. The ranking engine 526 can be configured to rank the indications based on their respective score and/or priority values. As described herein, the indications can be ranked based on their impact, from highest impact on website performance (e.g., highest priority value) to lowest impact on website performance (e.g., lowest priority value). The insights can be classified based on impact that the insights have on the customer's website performance. A high impact classification can cause a particular insight to be prioritized and thus ranked higher than insights having lower impact classifications. Similarly, a low impact classification can cause a particular insight to be ranked lower than insights that are prioritized with higher impact classifications. In some implementations, the impact classification can also increase or decrease the insight's score.

As described throughout this disclosure, each insight can be scored on a different scale. To rank these insights, the notification list generator 522 can normalize each insight score to a value on a same scale, such as 0 to 100. As part of normalizing an insight score, the insight score can be multiplied by some predetermined factor, where that predetermined factor is based on the impact classification for the corresponding insight. For example, a first insight can be classified as high impact and a second insight can be classified as low impact. The score for the first insight can be multiplied by a factor of five, which can be used for all insights that are classified as high impact. The score for the second insight can be multiplied by a factor of two, which can be used for all insights that are classified as low impact. These adjusted insight scores can then be normalized on the same scale to determine a priority for ranking the first and second insights relative to each other (and other insights).

The normalized scores can indicate a priority of the corresponding insights. The notification list generator 522 can then rank each of the insights from highest to lowest normalized score, which means the insights can be ranked from highest priority to lowest priority. As mentioned above, this ranking can then take into account both the insight scores and the impact classifications of the insights to generate a prioritized list of insights for the customer.

Priority of the corresponding insights can also be based on one or more metrics specific to each insight. An insight for keywords in an activity plan that move in or out of top three search results, for example, can be prioritized based on keyword search volume and/or position ranking of the keyword relative to other keywords. An insight for visibility score for an activity plan that has increased or decreased can be prioritized based on search volume of keyword(s) associated with the activity plan and/or position ranking of the keyword(s) associated with the activity plan. An insight for disavowing new low-value backlink(s) can be prioritized based on whether a trust score for a website associated with the backlink is less than a threshold value (e.g., trust score<20). An insight for reclaiming lost high-value backlinks can be prioritized based on whether the trust score for the website associated with the backlink is greater than a threshold value (e.g., trust score>70). An insight for adding a keyword to an activity plan can be prioritized based on keyword potential. Keyword potential can be calculated based on one or more sub metrics, such as search volume, position, competition, website quality score, and brand. An insight for target webpages having duplicate content can be prioritized based on page level, search volume, and/or ranking position of the duplicate webpages. Moreover, an insight for adding high potential keywords to an activity plan can be prioritized based on impressions, brand, and position.

Refer to FIGS. 1-3 for additional discussion about ranking the indications in the list of notifications.

The web analysis server system 500 can then transmit information that identifies the ranked list of notifications (e.g., an HTML file) to the client computing device 502 to be presented in a GUI display to the customer (step G), for example, by a web browser executing at the client computing device. Refer to FIGS. 1-3 for additional discussion about presenting the list of ranked notifications to the customer at the client computing device 502.

Figure 6:
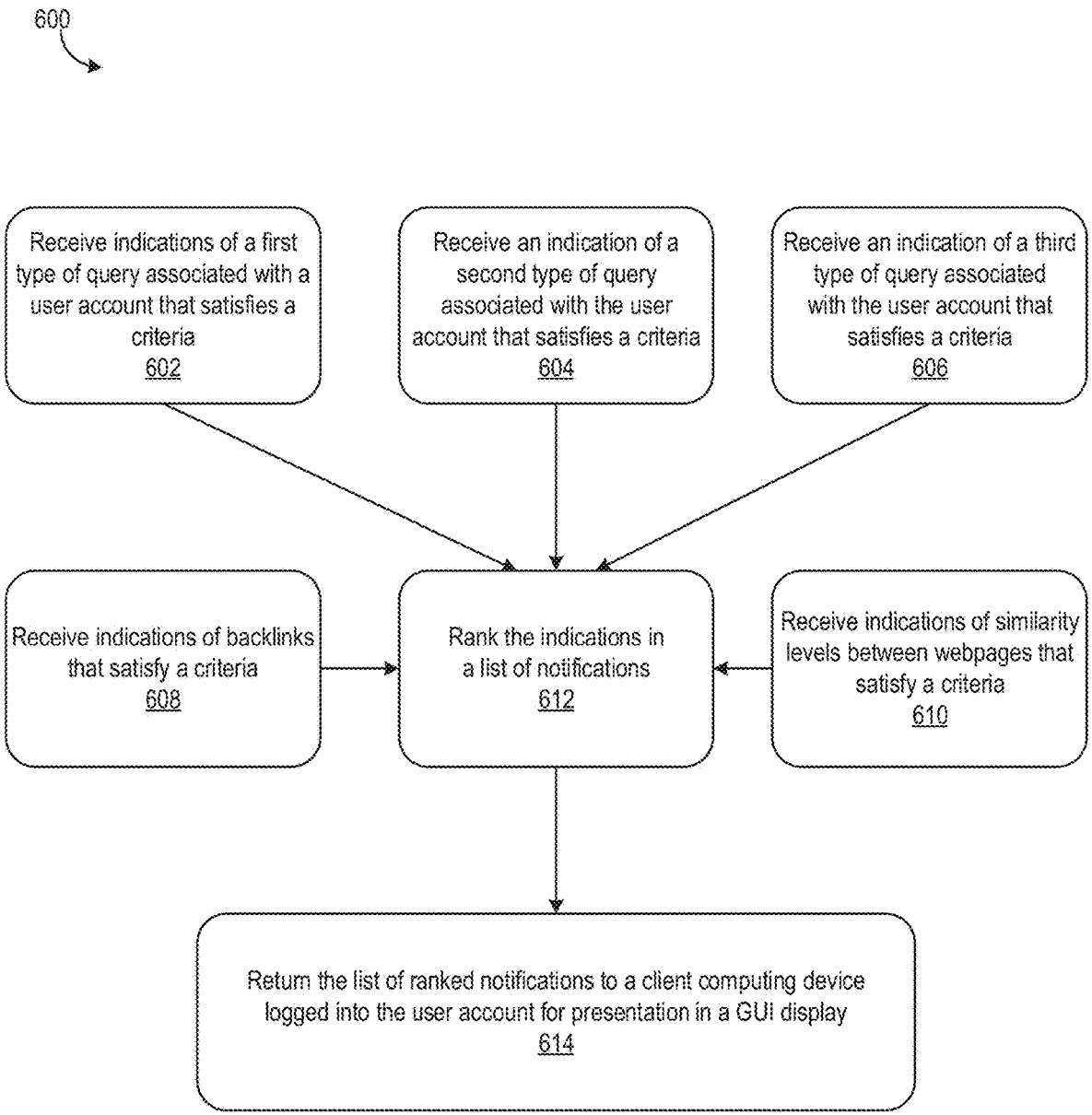
FIG. 6 is a flowchart of a process for presenting insights in a list of notifications, as depicted in FIG. 1.

FIG. 6 is a flowchart of a process 600 for presenting insights in a list of notifications, as depicted in FIG. 1. The process 600 describes aspects of the GUI depicted and described in FIG. 1. The process 600 can be performed by a web analysis server system described throughout this disclosure (e.g., refer to the web analysis server system 500 in FIG. 5). The process 600 can also be performed by one or more other computing systems, devices, computers, networks, cloud-based systems, and/or cloud-based services. For illustrative purposes, the process 600 is described from the perspective of a computer system.

Referring to the process 600 in FIG. 6, the computer system can receive indications of a first type of query associated with a user account that satisfies a criteria in block 602. At a same or different time, the computer system can receive an indication of a second type of query associated with the user account that satisfies a criteria in block 604. At a same or different time, in block 606, the computer system can also receive an indication of a third type of query associated with the user account that satisfies a criteria. The computer system can receive one or more additional or fewer indications of other types of queries associated with the user account that satisfy respective criteria. Refer to Table 1 for additional example insights. Each of the indications received in the blocks 602-606 can be insights generated by the computer system, including but not limited to keyword ranking (refer to FIGS. 7A-B) and/or potential keywords (refer to FIGS. 8A-B).

Figure 9:
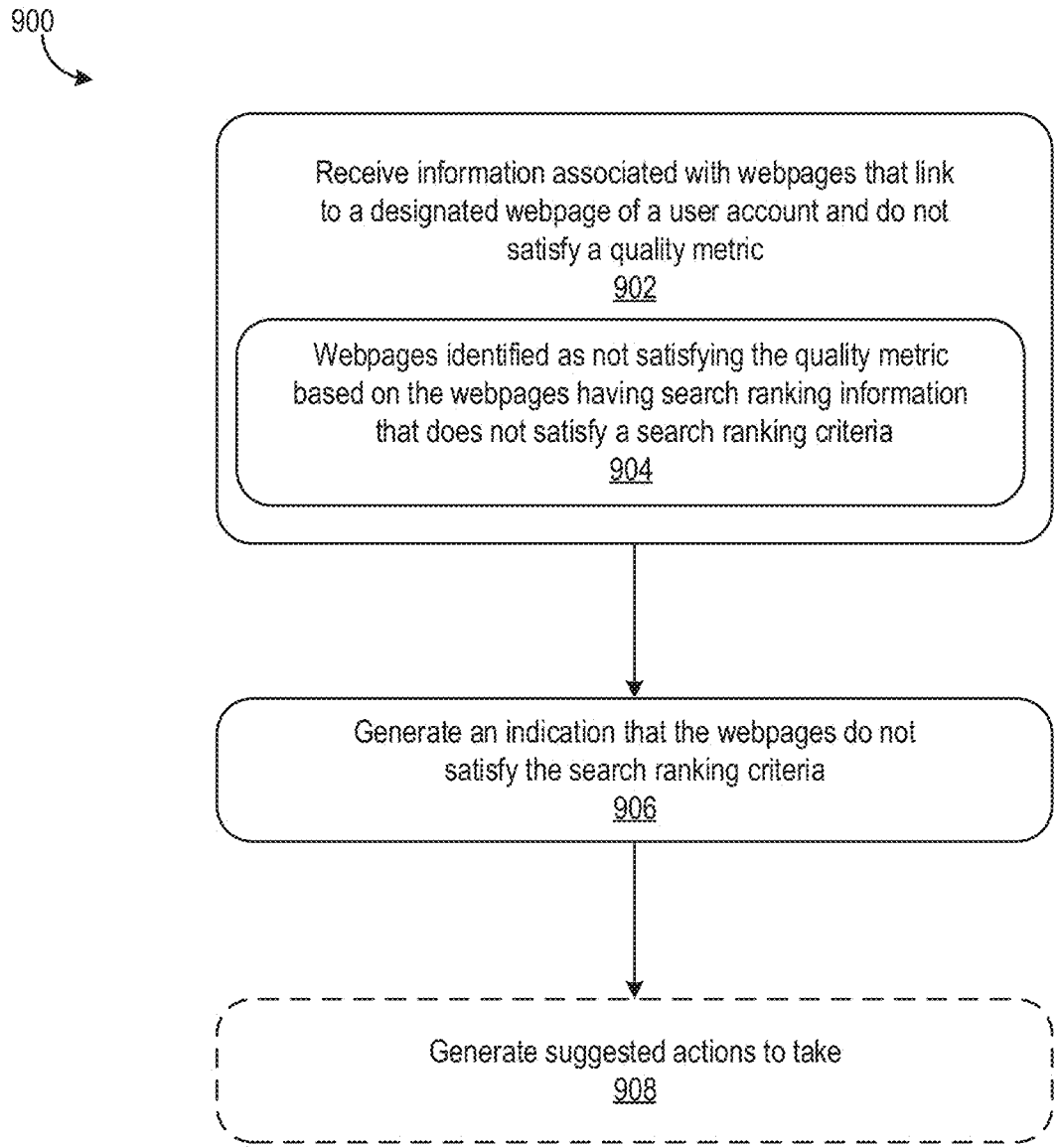
FIG. 9 is a flowchart of a process for generating an insight about low-value backlinks.

At a same or different time as any of the blocks 602-606, the computer system can receive indications of backlinks that satisfy a criteria (block 608) (refer to FIG. 9). As described herein, these indications can be insights about newly identified low-value backlinks to a webpage and/or webpages associated with the user account.

Figure 10:
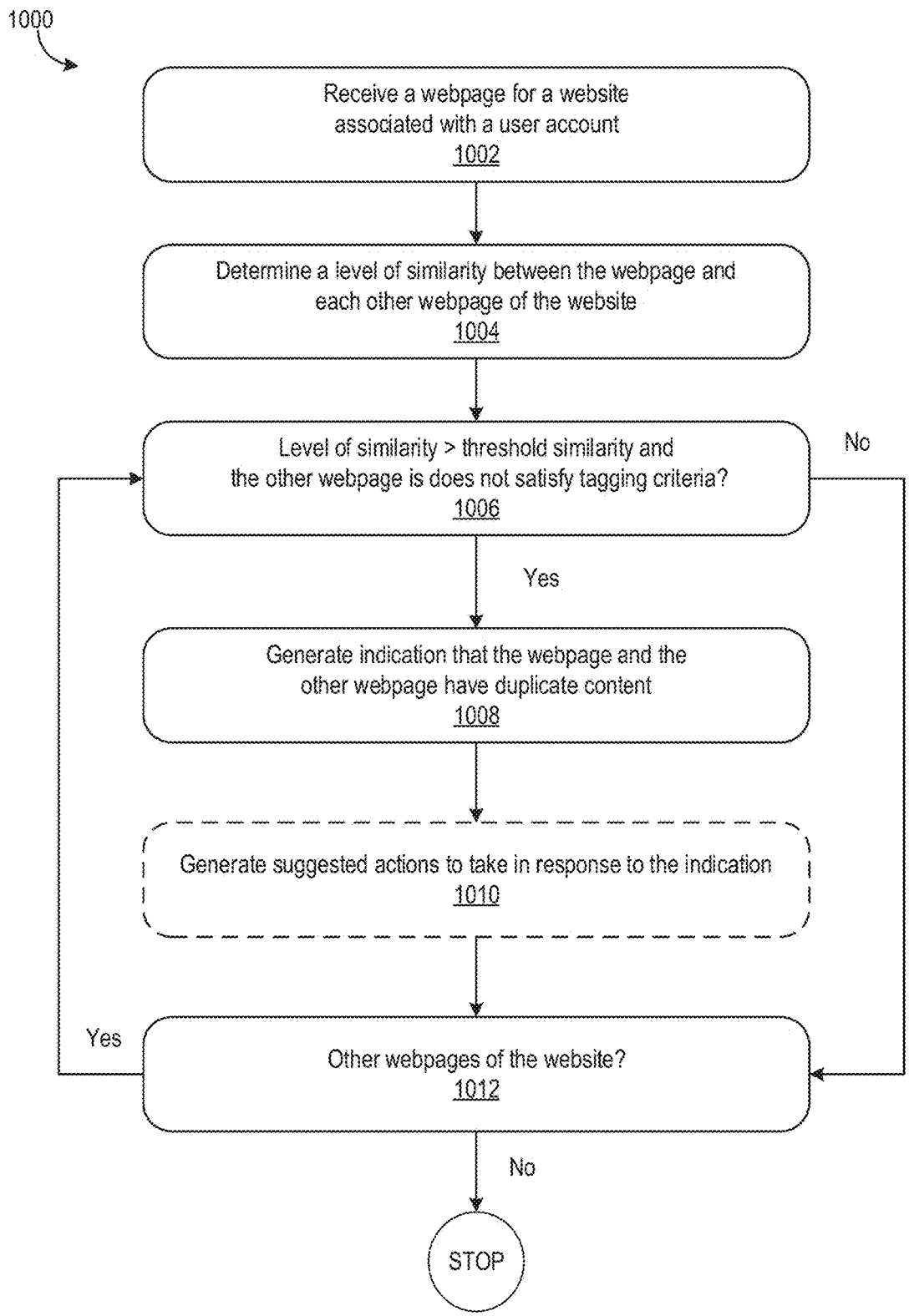
FIG. 10 is a flowchart of a process for generating an insight about duplicative content in a website.

At a same or different time as any of the blocks 602-608, the computer system may receive indications of similarity levels between webpages that satisfy a criteria (block 610) (refer to FIG. 10). As described herein, these indications can be insights about duplicate content that is identified between webpages (such as a target webpage and a non-target webpage) that are associated with the user account.

In block 612, the computer system can rank the indications received in blocks 602-610 into a list of notifications. Ranking can be based on a variety of metrics, such as one or more of or a combination of visibility, total estimated traffic, keyword count, and/or average position associated with each of the received indications. As described herein, the indications can be ranked based on impact to overall website performance. The indications can be ranked from greatest impact to lowest impact.

The computer system can then return the list of ranked notifications to a client computing device logged into the user account for presentation in a GUI display (block 614). Refer to FIGS. 1-3 for additional discussion about presenting the list of ranked notifications at the client computing device.

Figure 7A:
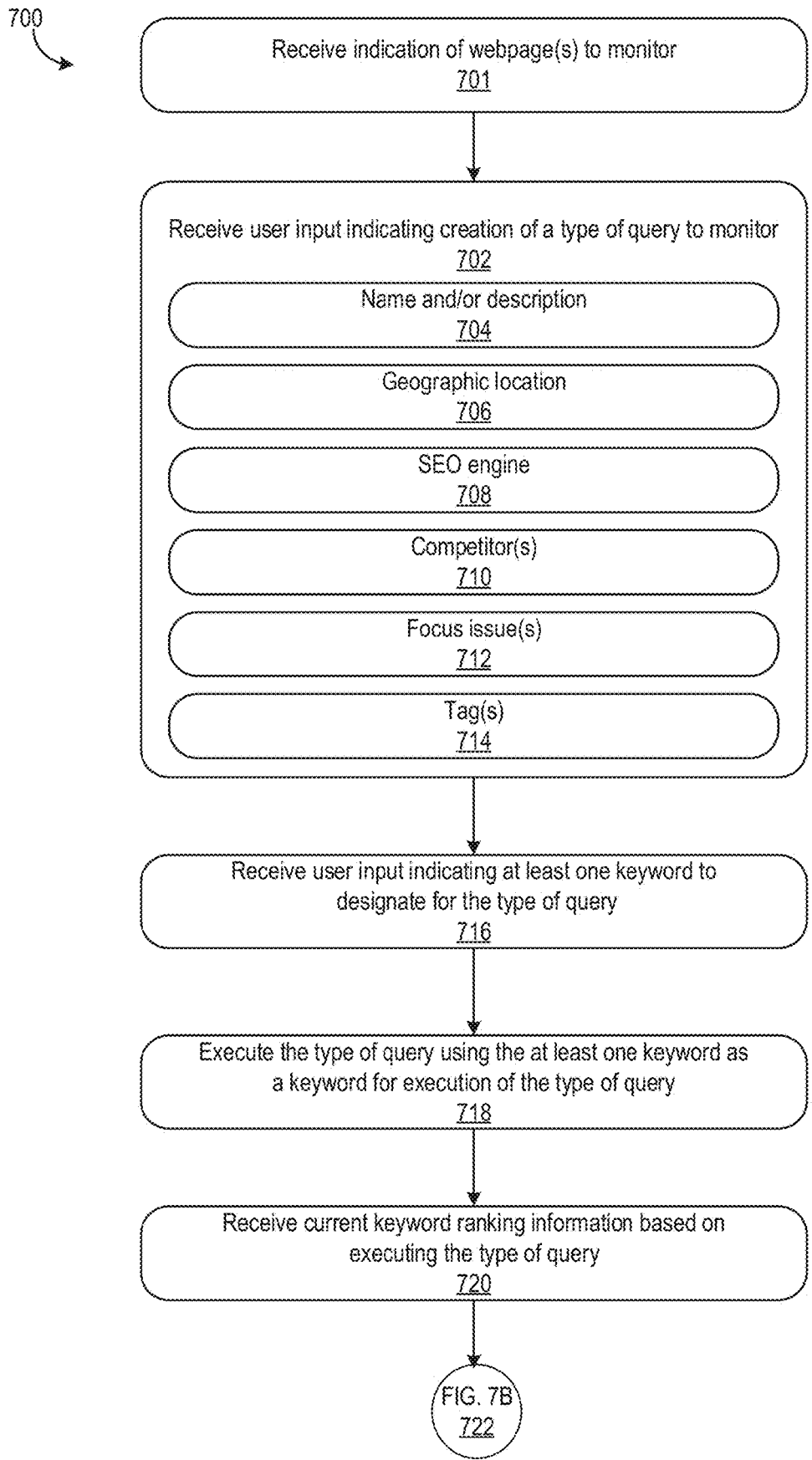
FIGS. 7A-B is a flowchart of a process for generating an insight about keyword ranking.
Figure 7B:
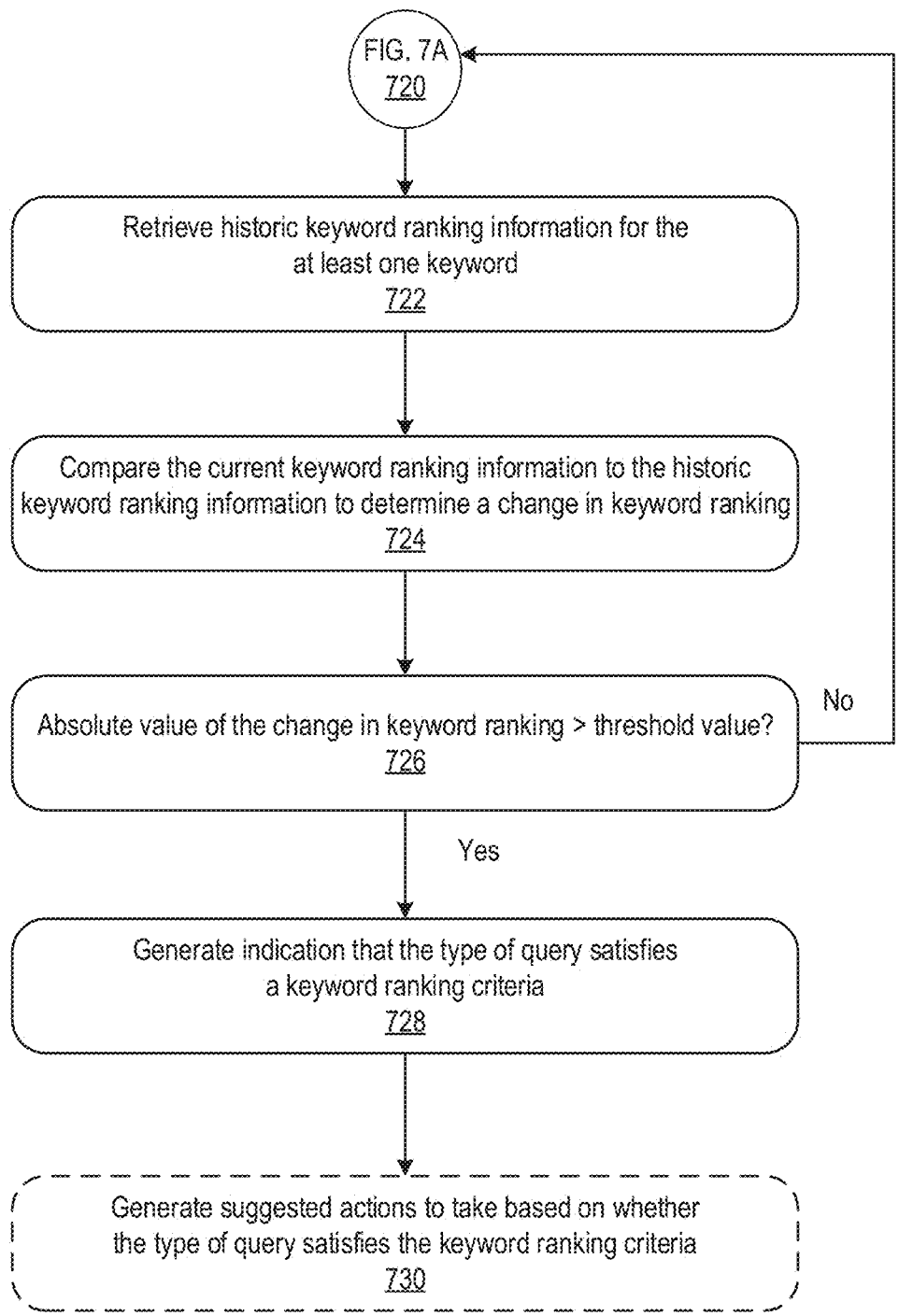

FIGS. 7A-B is a flowchart of a process 700 for generating an insight about keyword ranking. The process 700 describes aspects of the GUI depicted and described in FIG. 1. The process 700 can be performed by a web analysis server system described throughout this disclosure (e.g., refer to the web analysis server system 500 in FIG. 5). The process 700 can also be performed by one or more other computing systems, devices, computers, networks, cloud-based systems, and/or cloud-based services. For illustrative purposes, the process 700 is described from the perspective of a computer system.

Referring to the process 700 in both FIGS. 7A-B, the computer system can receive an indication of a webpage or webpages to monitor in block 701. The user's (e.g., customers) webpage, set of webpages, and/or website can be identified. The webpage can be identified and part of a user account associated with the user. Therefore, the computer system can pull the webpage information (e.g., URL, other identifier) from a data store that maintains user account information. The user may also provide user input at their client computing device that includes some indication of the webpage(s), such as a URL.

The computer system can receive user input indicating creation of a type of query (e.g., activity plan) to monitor (block 702). The user input can include a name and/or description (block 704), geographic location (block 706), SEO engine (block 708), competitor(s) (block 710), focus issue(s) (block 712), and/or tag(s) (block 714). Refer to the description in FIG. 4 for additional discussion about creating the type of query.

The computer system can receive user input indicating at least one keyword to designate for the type of query in block 716. Block 716 can be performed at the same time as any of the blocks 702-714. As depicted in the process 700, the block 716 can also be performed after any of the blocks 702-714, once the type of query has been created.

In block 718, the computer system can execute the type of query using the at least one keyword as a keyword for execution of the type of query. The type of query can be executed for the webpage(s) that is identified for monitoring in block 701. Executing the type of query can include requesting, by the computer system, that another service and/or system execute the query. The type of query can be executed at predetermined times, such as once a month, twice a month, three times a month, four times a month, etc. The customer can define how often they would like the type of query executed (e.g., a couple times a month, twice a week, etc.), as shown and described in FIG. 4. For example, each activity plan tier 412 in FIG. 4, which corresponds to the customer's services subscription plan with the computer system (e.g., the web analysis server system 500) can be associated with a different "frequency of keyword data updates." A "Bronze" tier, for example, can have one update per month while a "Platinum" tier, for example, can allow the customer to define an amount of updates per month.

The type of query can be executed once the at least one keyword has been added to the type of query. The customer can create the type of query on a first day of the month but may not add the keyword to the type of query until the tenth day of the month. If the customer selected the frequency of execution to be every two weeks, the computer system may not execute the type of query until two weeks after the tenth day of the month. On the other hand, if the customer adds the query on the same day that the customer creates the type of query, then the computer system may execute the type of query two weeks after that date.

The computer system can receive current keyword ranking information based on executing the type of query in block 720. The received information can be associated with the webpage(s) identified for monitoring in block 701. The information can be received from a querying system, web analysis services, and/or other third party computing systems described herein that executes the type of query (e.g., the querying system 506 in FIG. 5). As an illustrative example, the computer system can request a top 100 ranking webpages for the at least one keyword in a particular geographic location (block 706) or other information associated with the type of query. The computer system can receive URLs or other raw data for the webpages that are ranked 1-100. The URLs and/or other raw data can be received from a third part provider, such as a search engine. The computer system may then analyze the URLs and/or other raw data to determine the insight(s) described herein. For example, the computer system may perform mapping techniques to build relationships between ranking and keyword to see how SEO performance of a webpage associated with the customer changes over some predetermined period of time. The information can be collected over the predetermined period of time, such as a past thirty days. Therefore, the information can demonstrate any changes that might have occurred for the website over the past thirty days, based on the at least one keyword associated with the type of query.

The computer system can also retrieve historic keyword ranking information for the at least one keyword in block 722. The information can be received over some period of time, such as the past thirty days.

Next, the computer system can compare the current keyword ranking information to the historic keyword ranking information to determine a change in keyword ranking (block 724). The computer system can look at webpages that show up in search rankings with the at least one keyword, competitors who use the at least one keyword, and additional analytics about how the monitored webpage(s) change in time for the at least one keyword. Based on the received information, the computer system can determine whether and how the customer may use the at least one keyword to rank higher compared to their competitors. The computer system can also use this information to determine how much potential there is for the customer to grow their business and how much business the customer can organically bring in. Combination of multiple signals (e.g., information) can be used to determine value of the at least one keyword to the customer, in comparison to the value that keyword had in the past (e.g., thirty days ago). The value can be shown as a webpage of the customer ranking higher, a competitor doing worse in ranking for that keyword, estimated traffic increasing (e.g., number of clicks, conversions, click throughs, etc.), and/or an overall quality score of the website increasing. Based on such value, the computer system can generate insights, or indications that the type of query satisfies a keyword ranking criteria (refer to block 728).

The computer system can determine whether an absolute value of the change in keyword ranking exceeds a predetermined threshold value. The predetermined threshold value can determined by the customer and/or the computer system. The change in ranking ought to be significant enough to warrant satisfaction of a keyword ranking criteria. For example, if the webpage moves down one position in ranking over the past thirty days, this change may be insignificant and therefore may not warrant alerting the customer (thus the keyword ranking criteria would not be satisfied). If, on the other hand, the webpage moves down eight positions in ranking over the past thirty days, this may be a significant enough change to alert the customer (thus the keyword ranking criteria would be satisfied). The same logic applies to moving up in rankings. If the webpage moves up a significant amount of positions, then the computer system may notify the customer that they are performing well based on the at least one keyword.

If the absolute value of the change does not exceed the threshold value, the computer system can return to block 720 and wait for keyword ranking information to see if there is a change in ranking (e.g., wait until the next predetermined period of time to execute the type of query). In some implementations, the computer system can generate an indication (e.g., notification, message) that the at least one keyword is a good keyword and/or that the customer's webpage is performing well in search engine results based on the at least one keyword.

If the absolute value of the change does exceed the threshold value in block 726 (e.g., due to a notable increase or decrease in search result position for a given keyword or collection of keywords in search queries), the computer system can proceed to block 728. In block 728, the computer system can generate an indication (e.g., insight) that the type of query satisfies a keyword ranking criteria. The keyword ranking criteria can be generated and used by the computer system to determine whether the customer's webpage(s) and/or website is performing poorly relative to the at least one keyword associated with the type of query. For example, the keyword ranking criteria can be defined in such a way that allows the computer system to determine whether the customer's webpage is dropping ranks, receiving less traffic, having fewer click throughs, being outperformed by competitors, etc., all of which are signs that the at least one keyword is not helping the customer achieve their goals and optimize their webpage(s) and/or website performance.

The generated indication can be transmitted to the customer's client computing device to be presented to the customer in a GUI display. In some implementations, the indication can be transmitted to a user computing device that is logged into the same user account as the customer's client computing device. The user computing device can be the same as the customer's client computing device. In some implementations, the user computing device can be different than the client computing device. Refer to FIGS. 1-3 for additional discussion about the indication, which can be a notification in a list of notifications presented to the customer at their client computing device. The indication can provide information about why the customer's webpage(s) and/or website may not be performing optimally with regards to the at least one keyword in the type of query. The indication can provide the customer with information to make a semantic connection between the type of query and what the customer's webpage(s) and/or website is about. The indication can also help the customer to decide on performing content checks and prioritizing reviewing and improving webpages that have high volume potential but may not be performing well, as described in the indication.

The computer system can optionally generate suggested actions to take based on whether the type of query satisfies the keyword ranking criteria (block 730). The suggested actions can also be transmitted to the client computing device to be presented to the customer in a GUI display. Refer to FIGS. 1-3 for additional discussion. As an example, if the customer's webpage(s) and/or website performs well in relation to the at least one keyword, the computer system can suggest using the at least one keyword in one or more additional places throughout the customer's webpage(s) and/or website. The computer system can also suggest using the at least one keyword in metadata of the webpage(s) and/or website.

If, on the other hand, the webpage(s) and/or website does not perform well in relation to the at least one keyword (e.g., the keyword ranking criteria is satisfied), then the computer system can suggest removing the at least one keyword, replacing the at least one keyword with a potential keyword (e.g., refer to process 800 in FIGS. 8A-B), or otherwise changing the at least one keyword.

The suggested actions can be reviewed by the customer and applied by the customer. The customer may also choose to implement one or more other actions that are not suggested by the computer system. Any actions in response to the indication can be performed at the client computing device using one or more web analysis services, webpage editing tools, content management system (CMS) services, and/or querying systems. Any of these services and/or systems can be provided by a third party. In some implementations, any of these services and/or systems may also be provided by the computer system described herein.

Figure 8A:
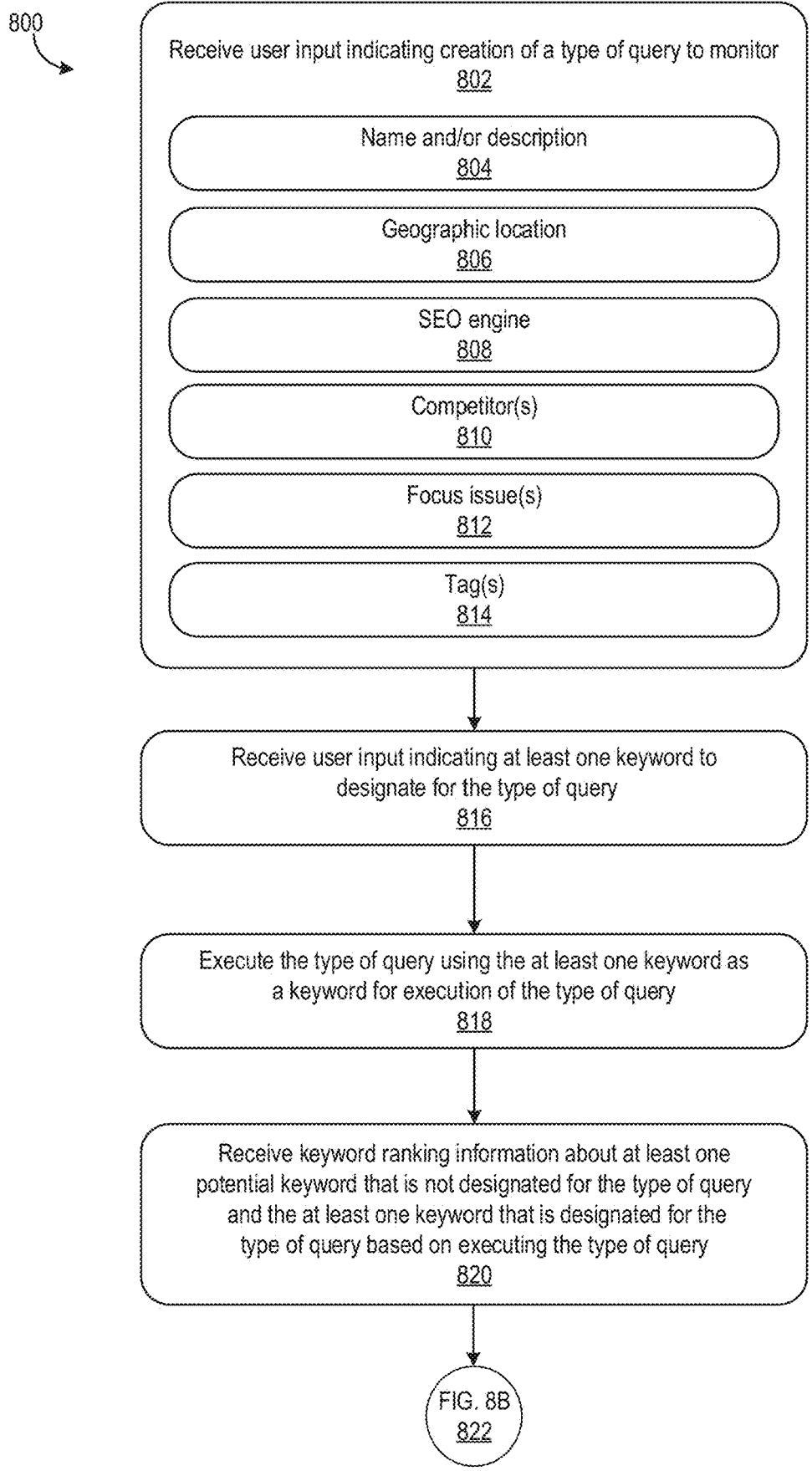
FIGS. 8A-B is a flowchart of a process for generating an insight about potential keywords that can be added to an activity plan.
Figure 8B:
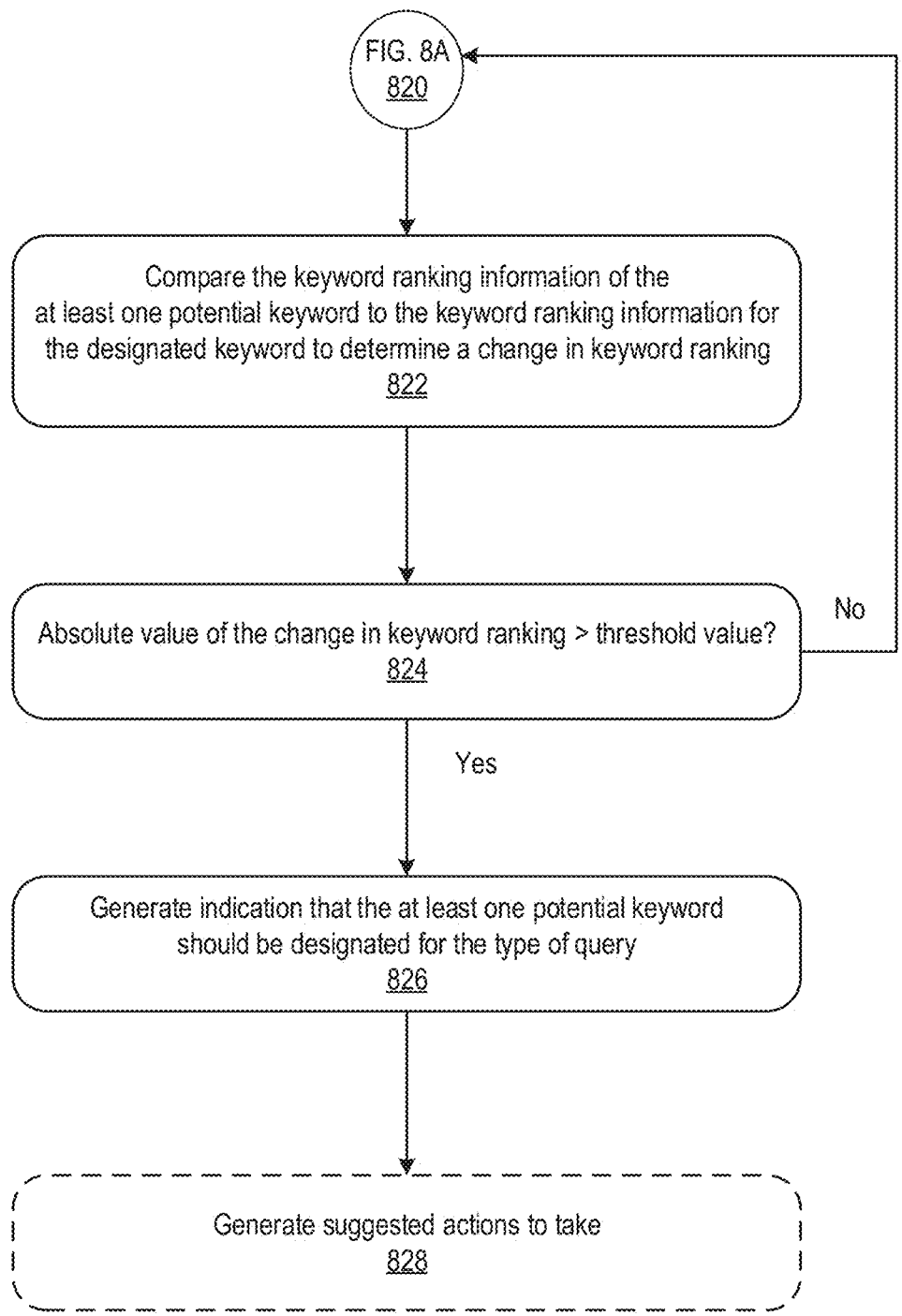

FIGS. 8A-B is a flowchart of a process 800 for generating an insight about potential keywords that can be added to an activity plan, or type of query. The process 800 describes aspects of the GUI depicted and described in FIG. 1. The process 800 can be performed by a web analysis server system described throughout this disclosure (e.g., refer to the web analysis server system 500 in FIG. 5). The process 800 can also be performed by one or more other computing systems, devices, computers, networks, cloud-based systems, and/or cloud-based services. For illustrative purposes, the process 800 is described from the perspective of a computer system.

Referring to the process 800 in FIGS. 8A-B, the computer system can receive user input indicating creation of a type of query (e.g., activity plan) to monitor (block 802). The user input can include a name and/or description (block 804), geographic location (block 806), SEO engine (block 808), competitor(s) (block 810), focus issue(s) (block 812), and/or tag(s) (block 814). Refer to blocks 702-714 in the process 700 of FIGS. 7A-B for further discussion.

The computer system can receive user input indicating at least one keyword to designate for the type of query in block 816. Refer to block 716 in the process 700 of FIGS. 7A-B.

In block 818, the computer system can execute the type of query using the at least one keyword as a keyword for execution of the type of query. Refer to block 718 in the process 700 of FIGS. 7A-B. As described herein, the type of query can be executed by another third party system, such as the querying system described throughout this disclosure. In some implementations, the type of query can be executed by the computer system. The querying system can provide raw data about the customer's webpage and/or website performance in search engine results to the computer system. The computer system can then determine how well the customer's webpage(s) and/or website perform (e.g., rank) in search engine results for the type of query. In addition to collecting/receiving information about the at least one keyword from the querying system, the querying system can also provide the computer system with information about the other keywords, such as their estimated traffic for other websites (e.g., websites of competitors), ranking of other websites based on the other keywords, etc.

The computer system can receive keyword ranking information about at least one potential keyword that is not designated for the type of query and the at least one keyword that is designated for the type of query based on executing the type of query (block 820). As mentioned above, this information can be received from the querying system. Refer to block 720 in the process 700 of FIGS. 7A-B. The information received from the querying system can include a list of highest performing keywords (or keywords that are performing within some predetermined threshold ranking). The computer system can then identify one or more of the potential keywords as keywords for which the customer's monitored webpage(s) performed well in search engine results for various types of queries that are being executed. In some implementations, the computer system can determine and generate indications that the at least one potential keyword is associated with an amount of traffic that exceeds some threshold level of traffic. The computer system can also determine and generate indications that the ranking associated with the at least one potential keyword exceeds the ranking associated with the at least one keyword of the type of query by more than a threshold amount. The computer system can, in some implementations, generate an indication about the at least one potential keyword to be presented to the customer at the client computing device (block 826). Therefore, the computer system can present the customer with a suggestion to add the at least one potential keyword to the type of query.

As an illustrative example of block 820, the computer system can instruct the querying system to run multiple different types of queries. The querying system can return raw data about the customer's webpage "pizzaplace.com" as it ranks in search results. Using the raw data, the computer system can identify that the customer's webpage "pizzaplace.com" is ranking as number fifteen for keyword "pizza" in a particular geographic region. Both "pizza" and the particular geographic region can be defined as part of a type of query by the customer. The computer system may also identify that the customer's webpage "pizzaplace.com" is ranking as number two for different, or potential, keywords such as "late-night," in types of queries that have been submitted out of the same particular geographic region. As such, the computer system can suggest that the customer add the keyword "late-night" to their current type of query so that the computer system can regularly monitor both keywords "pizza" and "late-night."

In block 822, the computer system can compare the keyword ranking information of the potential keyword to the keyword ranking information for the designated keyword to determine a change in keyword ranking. The keyword potential can be based on whether the keyword may grow organic rankings (e.g., be listed higher in search results), cause the customer's webpage(s) and/or website to have more exposure, cause an overall quality score of the website to increase, etc. The keyword potential can also be based on competition in a particular geographical location, language, search volume, calculation for estimated traffic, quality score for a particular webpage of the customer, how much traffic that webpage is currently receiving, etc. The keyword potential can be determined by the computer system when comparing the received information in block 822.

The computer system can determine whether an absolute value of the change in keyword ranking exceeds a threshold value (block 824). If the absolute value of the change does not exceed the threshold value, then the computer system can return to block 820. If the absolute value of the change does exceed the threshold value, then the computer system can proceed to block 826.

In block 826, the computer system can generate an indication that the at least one potential keyword should be designated for the type of query. The at least one potential keyword can be described in the indication as a branded keywords that the customer does not rank high for but competitors do. The potential keyword can also be described as a long-tail keyword with little competition for high ranking positions. The potential keyword may also be described as a keyword with high search volume where the customer's webpage(s) and/or website is in a high position.

Optionally, the computer system can generate suggested actions to take based on whether the absolute value of the change in keyword ranking exceeds the threshold value (block 828). The suggested actions can include adding the at least one potential keyword to the type of query and/or using the potential keyword more throughout the customer's webpage(s) and/or other webpages (e.g., add the potential keyword in metadata or make that keyword appear throughout the website). Another suggested action can prompt the customer to track the potential keyword (such as in the type of query or another type of query).

Refer to FIGS. 1-3 and the process 700 of FIGS. 7A-B for additional discussion about the process 800 of FIGS. 8A-B.

FIG. 9 is a flowchart of a process 900 for generating an insight about low-value backlinks. The process 900 describes aspects of the GUI depicted and described in FIG. 1. A querying system can crawl the internet, identify links between a customer's webpage and other webpages, and return those links to a web analysis server system described herein. The process 900 may not require a type of query (e.g., activity plan) to be executed. Instead the process 900 can be routinely performed by the web analysis server system to provide additional insights to the customer. Insights regarding low-value backlinks can be presented as indications in a same list of notifications as results from executing types of queries described throughout this disclosure. The insights regarding low-value backlinks can be ranked with respect to the insights associated with executed types of queries. As a result, the customer can view all insights in a cohesive stream of information, thereby making it more user-friendly and easier to prioritize how the customer will improve their webpage(s) and/or website based on the insights.

The process 900 can be performed by the web analysis server system described throughout this disclosure (e.g., refer to the web analysis server system 500 in FIG. 5). The process 900 can also be performed by one or more other computing systems, devices, computers, networks, cloud-based systems, and/or cloud-based services. For illustrative purposes, the process 900 is described from the perspective of a computer system.

Referring to the process 900 in FIG. 9, the computer system can receive information associated with webpages that link to a designated webpage of a user account and do not satisfy a quality metric (block 902). As described above, the information can be received from the querying system or another web analysis service or third party system. The customer associated with the user account can designate the webpage by providing user input at the customer's client computing device. The computer system can also automatically retrieve the webpage from a data store, where the webpage is associated with the user account of the customer. The information can be received at one or more predetermined times, as described in relation to the predetermined period of time in the process 700 of FIGS. 7A-B.

The quality metric can be determined by the computer system. In some implementations, the quality metric can be determined by the querying system and/or the customer. The quality metric can indicate a level of quality of a webpage that is linked to the designated webpage. If the quality of the linking webpage falls below some predetermined threshold quality level, then the linking webpage does not satisfy the quality metric. Thus, the linking webpage is of low quality and results in a low-level backlink to the designated webpage. As another example, in block 904, webpages are identified as not satisfying the quality metric based on the webpages having search ranking information that does not satisfy a search ranking criteria (e.g., the webpages rank below a threshold level of ranking in search results over the predetermined period of time). The querying system can transmit ranking information associated with the linking webpages to the computer system. The computer system can then determine whether the linking webpages satisfy the quality metric based on the ranking information.

The computer system can generate an indication that the webpages do not satisfy the search ranking criteria (block 906). The indication can be an insight about low-value backlinks associated with the customer's designated webpage. The indication can be a notification or other type of message that appears in a list of notifications, as described in relation to FIGS. 1-3. The indication can be ranked amongst indications that are generated in any of the other processes described herein (e.g., refer to FIGS. 6-8 and 10).

In block 908, the computer system can optionally generate suggested actions to take in response to the webpages not satisfying the search ranking criteria. The suggested actions can include removing one or more of the low-value backlinks. The suggested actions can also include disavowing one or more of the low-value backlinks. The suggested actions can also include requesting a search engine to disavow one or more of the low-value backlinks.

FIG. 10 is a flowchart of a process 1000 for generating an insight about duplicate content in a website. More specifically, the process 1000 can be performed to identify duplicate content in a target webpage of a customer's website. A web analysis service (provided by a third party system and/or the web analysis server system described herein) can crawl the customer's website to identify duplicate content. Duplicate content can cause a webpage to not appear in search engine results. Duplicate content can harm search result rankings for the website, especially if the duplicate content is associated with a target webpage of the website.

The process 1000 may not require a type of query (e.g., activity plan) to be executed. Instead, the process 1000 can be routinely performed by the web analysis server system to provide additional insights to the customer. Insights regarding duplicate content can be presented as indications in a same list of notifications as results from executing types of queries described throughout this disclosure. The insights regarding duplicate content can be ranked with respect to the insights associated with executed types of queries and insights associated with low-value backlinks. As a result, the customer can view all insights in a cohesive stream of information, thereby making it more user-friendly and easier to prioritize how the customer will improve their webpage(s) and/or website based on the insights.

The web analysis server system may use machine learning techniques, algorithms, and/or models to identify duplicate content in the process 1000. The machine learning techniques can be used to identify actual content of the customer's webpage by stripping away features such as headers, footers, and content blocks that replicate across multiple webpages (e.g., boilerplate content in the webpage) to focus on page content itself (e.g., perform segmentation on the webpage). The web analysis server system can then efficiently analyze the page content to more accurately identify duplicate content across the customer's website. Using machine learning techniques, the web analysis server system can determine patterns over time across different websites to provide for continuously improving the system's ability to identify duplicate content that harms the customer's website performance. Continuous improvements can increase accuracy in predicting and identifying both boilerplate content and duplicate content.

The machine learning techniques can also be used to calculate average and highest similarities for a particular webpage. Such calculations can be continuously performed. In some implementations, these calculations can be performed at predetermined periods of time (e.g., refer to the predetermined periods of time described in the process 700 of FIGS. 7A-B).

The web analysis server system can present webpage similarity, or duplicate content, as a percentage value to the customer. The percentage value can be user-friendly and easy for the customer to understand duplicate content and the effect it has on the customer's website performance.

The process 1000 describes aspects of the GUI depicted and described in FIG. 1. The process 1000 can be performed by a web analysis server system described throughout this disclosure (e.g., refer to the web analysis server system 500 in FIG. 5). The process 1000 can also be performed by one or more other computing systems, devices, computers, networks, cloud-based systems, and/or cloud-based services. For illustrative purposes, the process 1000 is described from the perspective of a computer system.

Referring to the process 1000 in FIG. 10, the computer system can receive a webpage for a website associated with a user account (block 1002). As described herein, the webpage can be a target webpage. The customer can designate the webpage. The computer system can also retrieve the webpage from a data store using information associated with the user account.

The computer system can determine a level of similarity between the webpage and each other webpage of the website (block 1004). As described above, the computer system can use machine learning techniques, algorithms, and/or models to identify similarities. In brief, the computer system can strip away redundant content in the webpage and the other webpages of the website, including but not limited to headers and footers. The computer system can then asses the remaining page content in the webpage and the other webpages to identify similarities and determine respective levels of similarity.

In block 1006, the computer system can determine whether the level of similarity exceeds a threshold similarity and the other webpage does not satisfy tagging criteria. The computer system can perform block 1006 for each level of similarity that is determined between the webpage and another webpage of the website. The threshold similarity can vary. The threshold similarity can be determined by the computer system and/or the customer. As an example, the threshold similarity can be sixty percent. Therefore, if the level of similarity is greater than sixty percent, there is duplicate content that harms performance of the webpage.

Moreover, if the other webpage is not appropriately tagged, then the duplicate content presents an issue to the customer. The other webpage does not satisfy tagging criteria if the other webpage does not have a no-index, no-follow, hreflang, and/or canonical tag. The no-index tag indicates that the other webpage should not be indexed by search engines and thus not shown on search engine results. The no-follow tag indicates that search engines should not follow a specific link associated with the other webpage. The hreflang tag includes an html <link> or <link> tag that notifies search engines of a relationship between pages in different languages, which can be used to serve correct regional or language URLs in search results based on a searcher's country/language preferences. The canonical tag is a signal in the other webpage that indicates the other webpage as being a copy of another webpage—thus duplicative content—and therefore directs a search engine to the original version of the webpage for presentation in search results.

If the level of similarity does not exceed the threshold similarity and the other webpage does satisfy the tagging criteria, then the computer system can proceed to block 1012, described below. If the level of similarity exceeds the threshold similarity and the other webpage does not satisfy the tagging criteria, then the computer system proceeds to block 1008. In block 1008, the computer system can generate an indication that the webpage and the other webpage have duplicate content. The indication can be an insight that is included and ranked in a list of notifications presented to the customer at the customer's client computing device, as described in reference to FIGS. 1-3.

The computer system can optionally generate suggested actions to take in response to the indication in block 1010. The suggested actions can include removing the duplicate content. The suggested actions can also include applying at least one of a no-index tag, a no-follow tag, an hreflang tag, and a canonical tag to the other webpages of the website that are not target pages.

In block 1012, the computer system can determine whether there are other webpages in the website to compare against the webpage (e.g., the target webpage). If there are no more webpages for the comparison, the process 1000 can stop. If there are more webpages in the website to compare, then the computer system can return to block 1006 and repeat blocks 1006-1010 for each remaining webpage that has some level of similarity with the webpage.

Figure 11:
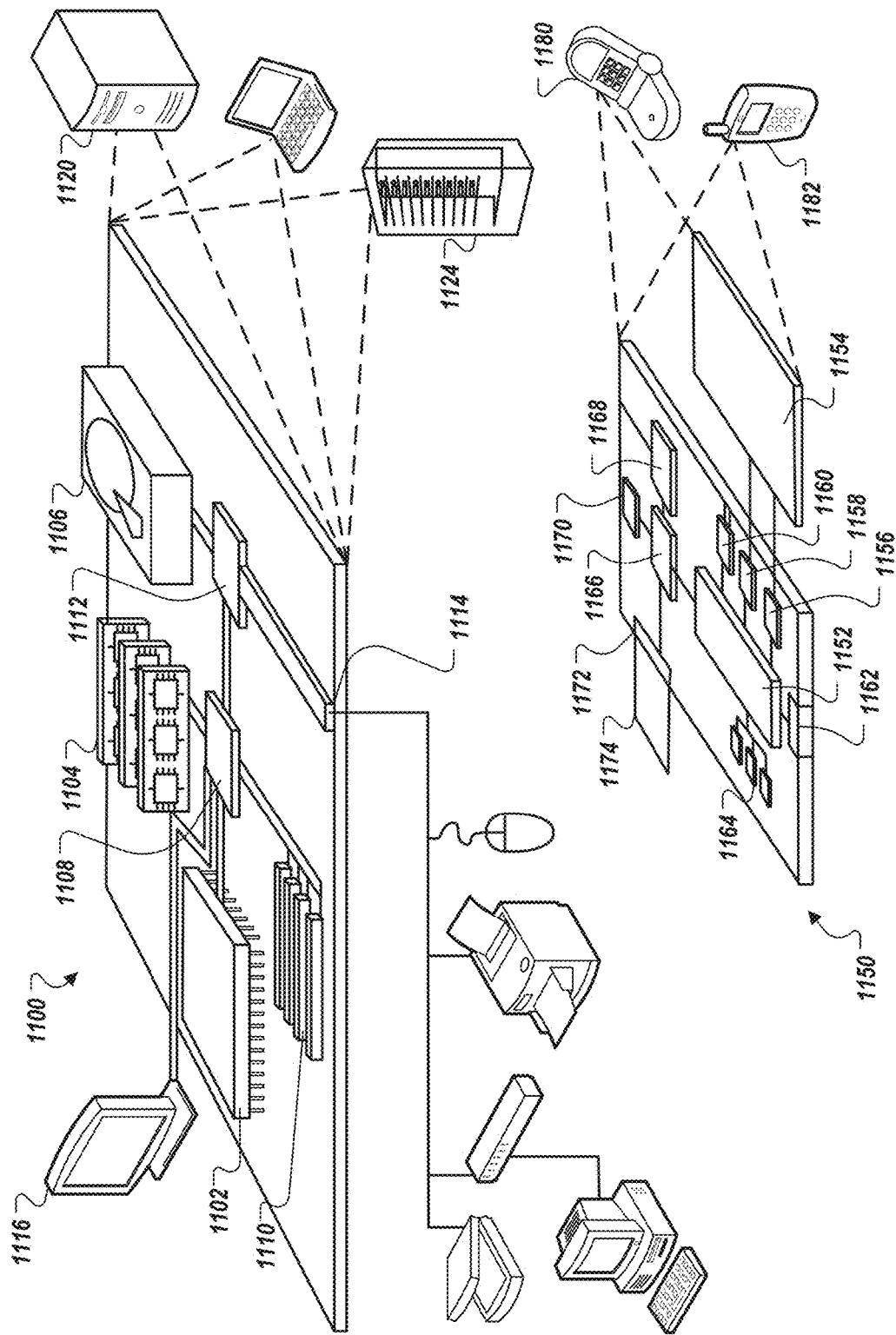
FIG. 11 is a schematic diagram that shows an example of a computing device and a mobile computing device.

FIG. 11 shows an example of a computing device 1100 and an example of a mobile computing device that can be used to implement the techniques described here. The computing device 1100 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1100 includes a processor 1102, a memory 1104, a storage device 1106, a high-speed interface 1108 connecting to the memory 1104 and multiple high-speed expansion ports 1110, and a low-speed interface 1112 connecting to a low-speed expansion port 1114 and the storage device 1106. Each of the processor 1102, the memory 1104, the storage device 1106, the high-speed interface 1108, the high-speed expansion ports 1110, and the low-speed interface 1112, are interconnected using various busses, and can be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as a display 1116 coupled to the high-speed interface 1108. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1104 stores information within the computing device 1100. In some implementations, the memory 1104 is a volatile memory unit or units. In some implementations, the memory 1104 is a non-volatile memory unit or units. The memory 1104 can also be another form of computer-readable medium, such as a magnetic or optical disk.

The storage device 1106 is capable of providing mass storage for the computing device 1100. In some implementations, the storage device 1106 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1104, the storage device 1106, or memory on the processor 1102.

The high-speed interface 1108 manages bandwidth-intensive operations for the computing device 1100, while the low-speed interface 1112 manages lower bandwidth-intensive operations. Such allocation of functions is exemplary only. In some implementations, the high-speed interface 1108 is coupled to the memory 1104, the display 1116 (e.g., through a graphics processor or accelerator), and to the high-speed expansion ports 1110, which can accept various expansion cards (not shown). In the implementation, the low-speed interface 1112 is coupled to the storage device 1106 and the low-speed expansion port 1114. The low-speed expansion port 1114, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1100 can be implemented in a number of different forms, as shown in the figure. For example, it can be implemented as a standard server 1120, or multiple times in a group of such servers. In addition, it can be implemented in a personal computer such as a laptop computer 1122. It can also be implemented as part of a rack server system 1124. Alternatively, components from the computing device 1100 can be combined with other components in a mobile device (not shown), such as a mobile computing device 1150. Each of such devices can contain one or more of the computing device 1100 and the mobile computing device 1150, and an entire system can be made up of multiple computing devices communicating with each other.

The mobile computing device 1150 includes a processor 1152, a memory 1164, an input/output device such as a display 1154, a communication interface 1166, and a transceiver 1168, among other components. The mobile computing device 1150 can also be provided with a storage device, such as a micro-drive or other device, to provide additional storage. Each of the processor 1152, the memory 1164, the display 1154, the communication interface 1166, and the transceiver 1168, are interconnected using various buses, and several of the components can be mounted on a common motherboard or in other manners as appropriate.

The processor 1152 can execute instructions within the mobile computing device 1150, including instructions stored in the memory 1164. The processor 1152 can be implemented as a chipset of chips that include separate and multiple analog and digital processors. The processor 1152 can provide, for example, for coordination of the other components of the mobile computing device 1150, such as control of user interfaces, applications run by the mobile computing device 1150, and wireless communication by the mobile computing device 1150.

The processor 1152 can communicate with a user through a control interface 1158 and a display interface 1156 coupled to the display 1154. The display 1154 can be, for example, a TFT (Thin-Film-Transistor Liquid Crystal Display) display or an OLED (Organic Light Emitting Diode) display, or other appropriate display technology. The display interface 1156 can comprise appropriate circuitry for driving the display 1154 to present graphical and other information to a user. The control interface 1158 can receive commands from a user and convert them for submission to the processor 1152. In addition, an external interface 1162 can provide communication with the processor 1152, so as to enable near area communication of the mobile computing device 1150 with other devices. The external interface 1162 can provide, for example, for wired communication in some implementations, or for wireless communication in other implementations, and multiple interfaces can also be used.

The memory 1164 stores information within the mobile computing device 1150. The memory 1164 can be implemented as one or more of a computer-readable medium or media, a volatile memory unit or units, or a non-volatile memory unit or units. An expansion memory 1174 can also be provided and connected to the mobile computing device 1150 through an expansion interface 1172, which can include, for example, a SIMM (Single In Line Memory Module) card interface. The expansion memory 1174 can provide extra storage space for the mobile computing device 1150, or can also store applications or other information for the mobile computing device 1150. Specifically, the expansion memory 1174 can include instructions to carry out or supplement the processes described above, and can include secure information also. Thus, for example, the expansion memory 1174 can be provide as a security module for the mobile computing device 1150, and can be programmed with instructions that permit secure use of the mobile computing device 1150. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1164, the expansion memory 1174, or memory on the processor 1152. In some implementations, the computer program product can be received in a propagated signal, for example, over the transceiver 1168 or the external interface 1162.

The mobile computing device 1150 can communicate wirelessly through the communication interface 1166, which can include digital signal processing circuitry where necessary. The communication interface 1166 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1168 using a radio-frequency. In addition, short-range communication can occur, such as using a Bluetooth, WiFi, or other such transceiver (not shown). In addition, a GPS (Global Positioning System) receiver module 1170 can provide additional navigation- and location-related wireless data to the mobile computing device 1150, which can be used as appropriate by applications running on the mobile computing device 1150.

The mobile computing device 1150 can also communicate audibly using an audio codec 1160, which can receive spoken information from a user and convert it to usable digital information. The audio codec 1160 can likewise generate audible sound for a user, such as through a speaker, e.g., in a handset of the mobile computing device 1150. Such sound can include sound from voice telephone calls, can include recorded sound (e.g., voice messages, music files, etc.) and can also include sound generated by applications operating on the mobile computing device 1150.

The mobile computing device 1150 can be implemented in a number of different forms, as shown in the figure. For example, it can be implemented as a cellular telephone 1180. It can also be implemented as part of a smart-phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A computer-implemented method for providing insights to a user about at least one webpage, the computer-implemented method comprising:

receiving, by a computing system, an indication that user input at a user computing device that is logged into a user account with the computing system specified a type of query, including by specifying that the type of query indicates (i) a first keyword to submit within queries of the type of query, and (ii) a first geographic location of computing devices from which queries of the type of query originate;

identifying, by the computing system, a webpage amongst a plurality of webpages of a website corresponding to the user account to locate within search results of queries that are of the type of query due to the queries of the type of query including the first keyword and indicating that the queries of the type of query were requested from computing devices at the first geographic location;

receiving, by the computing system, information from a plurality of web analysis computing systems, wherein each of the plurality of web analysis computing systems comprises processors and memory that is configured to analyze the webpage, wherein the plurality of web analysis computing systems comprise a querying computing system, wherein the information received from the querying computing system indicates a search ranking of the webpage for the type of query from within search results received responsive to submission of one or more queries of the type of query, due to the one or more queries of the first type of query including the first keyword and indicating that the one or more queries of the first type of query were requested from computing devices at the first geographic location;

receiving, by the computing system from the plurality of web analysis computing systems, historic webpage information that includes at least a historic search ranking of the webpage for the type of query; and performing, by the computing system, in real-time while the webpage is being updated, the following:

comparing, by the computing system, the search ranking of the webpage for the type of query to the received historic search ranking of the webpage to determine a change in search ranking of the webpage for the type of query;

determining, by the computing system, whether the change in search ranking of the webpage for the type of query satisfies criteria that corresponds to a threshold level of search ranking movement, generating, by the computing system, at least one action to perform by the user computing device or one of the plurality of web analysis computing systems to improve the search ranking of the webpage for the type of query based on the type of query not achieving the threshold level of search ranking movement, wherein the at least one action includes removing the first keyword from the webpage or replacing the first keyword in the webpage with a candidate keyword, generating, by the computing system, a list of notifications including (i) an indication that the search ranking of the webpage for the type of query has changed and (ii) the generated at least one action to perform to improve the search ranking of the webpage;

determining, by the computing system, a priority score for each notification in the list of notifications based at least in part on an impact level associated with the notification on at least the website;

normalizing, by the computing system, each priority score based on applying an impact factor to the priority score, wherein the impact factor is based on the impact level associated with the notification;

ranking, by the computing system, the list of notifications to generate a list of ranked notifications based on the respective normalized score, from a highest normalized score to a lowest normalized score, wherein the highest normalized score indicates a notification of highest priority; and providing, by the computing system, information to cause the user computing device logged into the user account to present a graphical user interface (GUI) that includes the list of ranked notifications, wherein, in response to receiving user input indicating selection of a notification in the list of ranked notifications, the user computing device is configured to present a pop-out window overlaying at least a portion of the GUI, the pop-out window presenting information about the selected notification, wherein the information about the selected notification includes (i) a graphical element depicting an average ranking of keywords associated with the webpage, (ii) a table outputting top keywords for the webpage and their associated rankings, and (iii) selectable options to prioritize, deprioritize, or dismiss the notification.

2. The computer-implemented method of claim 1, further comprising:

receiving, by the computing system, an indication that user input at the user computing device that is logged into the user account specified a second type of query, including by specifying that the second type of query indicates (i) a second keyword to submit within queries of the second type of query, and (ii) a second geographic location of computing devices from which queries of the second type of query originate, the second keyword being different from the first keyword and the second geographic location being different from the first geographic location;

identifying, by the computing system, the webpage to identify from within search results of queries that are of the second type of query due to the queries of the second type of query including the second keyword and indicating that the queries of the second type of query were requested from computing devices at the second geographic location;

receiving, by the computing system, information from the querying computing system indicating a second search ranking of the webpage for the second type of query from within search results received responsive to submission of one or more queries of the second type of query, due to the one or more queries of the second type of query including the second keyword and indicating that the one or more queries of the second type of query were requested from computing devices at the second geographic location;

receiving, by the computing system from the plurality of web analysis computing systems, second historic webpage information that includes at least a second historic search ranking of the webpage for the second type of query; and performing, by the computing system, in real-time while the webpage is being updated, the following:

comparing, by the computing system, the second search ranking of the webpage for the second type of query to the second historic search ranking of the webpage for the second type of query to determine a second change in search ranking of the webpage for the second type of query; and determining, by the computing system, whether the second change in search ranking of the webpage for the second type of query satisfies second criteria that corresponds to a second threshold level of search ranking movement, wherein the GUI includes, as part of the list of ranked notifications and based on the second type of query having achieved the second threshold level of search ranking movement, an indication that the second search ranking of the webpage for the second type of query has changed.

3. The computer-implemented method of claim 2, further comprising:

determining, by the computing system, a first ranking for the indication that the search ranking of the webpage for the type of query has changed, within the list of ranked notifications presented by the GUI, based on total estimated traffic to the webpage from queries of the type of query, wherein the GUI presents the indication that the search ranking of the webpage for the type of query has changed at a first position within the list of ranked notifications that is based on the first ranking; and determining, by the computing system, a second ranking for the indication that the second search ranking of the webpage for the second type of query has changed, within the list of ranked notifications presented by the GUI, based on total estimated traffic to the webpage from queries of the second type of query, wherein the GUI presents the indication that the second search ranking of the webpage for the second type of query has changed at a second position within the list of ranked notifications based on the second ranking.

4. The computer-implemented method of claim 3, wherein each notification that is presented by the GUI in the list of ranked notifications comprises an indication that a search ranking of the webpage for a corresponding type of query has changed.

5. The computer-implemented method of claim 3, wherein multiple notifications that are presented by the GUI in the list of ranked notifications correspond to indications that a search ranking for a same type of query has changed.

6. The computer-implemented method of claim 3, wherein at least a portion of indications in the list of ranked notifications corresponds to different types of queries.

7. The computer-implemented method of claim 1, further comprising receiving, by the computing system, an indication that user input at the user computing device specified the webpage, to cause the querying computing system to locate the webpage within search results of queries that are of the type of query.

8. The computer-implemented method of claim 1, further comprising:

receiving, by the computing system and from the querying computing system, information identifying a suggested keyword for which the webpage appears in search results of queries requested from computing devices at the first geographic location, the suggested keyword having not been specified for the type of query by user input in association with the user account; and providing, by the computing system, information to cause the GUI to include, as part of the list of ranked notifications, an indication that the suggested keyword appears in search results for queries requested from computing devices at the first geographic location.

9. The computer-implemented method of claim 1, further comprising:

receiving, by the computing system, information that identifies that multiple webpages link to the webpage and are identified as being below a threshold level of website quality, wherein the information provided to the user computing device logged into the user account causes the user computing device to present, as part of the list of ranked notifications, an indication that the multiple webpages link to the webpage and are below the threshold level of quality.

10. The computer-implemented method of claim 9, wherein the indication that the multiple webpages link to the webpage and are below the threshold level of quality includes a suggestion to remove at least one link between at least one of the multiple webpages and the webpage.

11. The computer-implemented method of claim 1, further comprising:

determining, by the computing system, that a first webpage and a second webpage include duplicative content presented by each of the first webpage and the second webpage, the first webpage and the second webpage being webpages of a website that includes the webpage, wherein the information provided to the user computing device logged into the user account causes the user computing device to present, as part of the list of ranked notifications, an indication that the first webpage and the second webpage include the duplicative content presented by each of the first webpage and the second webpage.

12. The computer-implemented method of claim 11, wherein the indication that the first webpage and the second webpage include the duplicative content includes a suggestion to remove the duplicative content from at least one of the first webpage and the second webpage.

13. The computer-implemented method of claim 11, wherein the indication that the first webpage and the second webpage include the duplicative content includes a suggestion to apply at least one of a no-index tag, a no-follow tag, an hreflang tag, and a canonical tag to at least one of the first webpage and the second webpage.

14. The computer-implemented method of claim 1, wherein a higher impact level corresponds to a higher impact factor than a lower impact level.

15. A system for providing insights to a user about at least one webpage, the system comprising:

a computing system comprising processors and memory that is configured to store instructions that, when executed by the processors, cause the computing system to perform operations comprising:

receiving an indication that user input at a user computing device that is logged into a user account with the computing system specified a type of query, including by specifying that the type of query indicates (i) a first keyword to submit within queries of the type of query, and (ii) a first geographic location of computing devices from which queries of the type of query originate;

identifying a webpage amongst a plurality of webpages of a website corresponding to the user account to locate within search results of queries that are of the type of query due to the queries of the type of query including the first keyword and indicating that the queries of the type of query were requested from computing devices at the first geographic location;

receiving information from a plurality of web analysis computing systems, wherein each of the plurality of web analysis computing systems comprises processors and memory that is configured to analyze the webpage, wherein the plurality of web analysis computing systems comprise a querying computing system, wherein the information received from the querying computing system indicates a search ranking of the webpage for the type of query from within search results received responsive to submission of one or more queries of the type of query, due to the one or more queries of the first type of query including the first keyword and indicating that the one or more queries of the first type of query were requested from computing devices at the first geographic location;

receiving, from the plurality of web analysis computing systems, historic webpage information that includes at least a historic search ranking of the webpage for the type of query; and performing in real-time while the webpage is being updated, the following:
  comparing the search ranking of the webpage for the type of query to the received historic search ranking of the webpage to determine a change in search ranking of the webpage for the type of query;
  determining whether the change in search ranking of the webpage for the type of query satisfies criteria that corresponds to a threshold level of search ranking movement,
  generating at least one action to perform by the user computing device or one of the plurality of web analysis computing systems to improve the search ranking of the webpage for the type of query based on the type of query not achieving the threshold level of search ranking movement, wherein the at least one action includes removing the first keyword from the webpage or replacing the first keyword in the webpage with a candidate keyword,
  generating a list of notifications including (i) an indication that the search ranking of the webpage for the type of query has changed and (ii) the generated at least one action to perform to improve the search ranking of the webpage;
  determining a priority score for each notification in the list of notifications based at least in part on an impact level associated with the notification on at least the website;
  normalizing each priority score based on applying an impact factor to the priority score, wherein the impact factor is based on the impact level associated with the notification;
  ranking the list of notifications to generate a list of ranked notifications based on the respective normalized score, from a highest normalized score to a lowest normalized score, wherein the highest normalized score indicates a notification of highest priority; and
  providing information to cause the user computing device logged into the user account to present a graphical user interface (GUI) that includes the list of ranked notifications, wherein, in response to receiving user input indicating selection of a notification in the list of ranked notifications, the user computing device is configured to present a pop-out window overlaying at least a portion of the GUI, the pop-out window presenting information about the selected notification, wherein the information about the selected notification includes (i) a graphical element depicting an average ranking of keywords associated with the webpage, (ii) a table outputting top keywords for the webpage and their associated rankings, and (iii) selectable options to prioritize, deprioritize, or dismiss the notification.

16. The system of claim 15, wherein the operations further comprise receiving an indication that user input at the user computing device specified the webpage, to cause the querying computing system to locate the webpage within search results of queries that are of the type of query.

17. The system of claim 15, wherein the operations further comprise:
  receiving, from the querying computing system, information identifying a suggested keyword for which the webpage appears in search results of queries requested from computing devices at the first geographic location, the suggested keyword having not been specified for the type of query by user input in association with the user account; and
  providing information to cause the GUI to include, as part of the list of ranked notifications, an indication that the suggested keyword appears in search results for queries requested from computing devices at the first geographic location.

18. The system of claim 15, wherein the operations further comprise:
  receiving information that identifies that multiple webpages link to the webpage and are identified as being below a threshold level of website quality,
  wherein the information provided to the user computing device logged into the user account causes the user computing device to present, as part of the list of ranked notifications, an indication that the multiple webpages link to the webpage and are below the threshold level of quality.

19. The system of claim 18, wherein the indication that the multiple webpages link to the webpage and are below the threshold level of quality includes a suggestion to remove at least one link between at least one of the multiple webpages and the webpage.

20. The system of claim 15, wherein the operations further comprise:
  determining that a first webpage and a second webpage include duplicative content presented by each of the first webpage and the second webpage, the first webpage and the second webpage being webpages of a website that includes the webpage,
  wherein the information provided to the user computing device logged into the user account causes the user computing device to present, as part of the list of ranked notifications, an indication that the first webpage and the second webpage include the duplicative content presented by each of the first webpage and the second webpage.

* * * * *